(12) United States Patent
Doynov

(10) Patent No.: US 12,009,656 B1
(45) Date of Patent: Jun. 11, 2024

(54) METHODS AND SYSTEMS FOR PROTECTION OF ELECTRIC NETWORK FROM TRANSIENT ELECTROMAGNETIC SURGES USING INLINE EMBEDDED MITIGATION

(71) Applicant: One Wave LLC, Kansas City, MO (US)

(72) Inventor: Plamen Doynov, Kansas City, MO (US)

(73) Assignee: One Wave LLC, Kansas City, MO (US)

( * ) Notice: Subject to any disclaimer, the term of this patent is extended or adjusted under 35 U.S.C. 154(b) by 0 days.

(21) Appl. No.: 18/542,019

(22) Filed: Dec. 15, 2023

(51) Int. Cl.
  *H02H 9/04* (2006.01)
  *H02H 9/00* (2006.01)
  *H02H 9/02* (2006.01)

(52) U.S. Cl.
  CPC ............ *H02H 9/04* (2013.01); *H02H 9/005* (2013.01); *H02H 9/02* (2013.01)

(58) Field of Classification Search
  CPC ........... H02H 9/04; H02H 5/00; H02H 9/045; H02H 5/005; H02H 3/22; H02H 9/041; H02H 1/04; H02H 3/023; H02H 3/08; H02H 3/105; H02H 3/16; H02H 7/26; H02H 9/005; H02H 9/00; H02H 9/046; H02J 3/1821

USPC .................................................. 361/117–120
See application file for complete search history.

(56) References Cited

U.S. PATENT DOCUMENTS

| | | | |
|---|---|---|---|
| 2012/0206848 A1* | 8/2012 | Gillespie | H01T 4/06 361/104 |
| 2012/0250205 A1* | 10/2012 | Pfitzer | H02H 9/041 361/91.1 |
| 2018/0254629 A1* | 9/2018 | Gattis | H01C 7/126 |
| 2019/0214814 A1* | 7/2019 | Carty | H02H 9/04 |

* cited by examiner

*Primary Examiner* — Danny Nguyen
(74) *Attorney, Agent, or Firm* — Fresh IP PLC; John R. Bednarz

(57) ABSTRACT

A method and system may suppress EM-induced voltage surges due to transient electromagnetic energy disturbance such as a detonation of a nuclear weapon at high altitude generating an EMP (HEMP), intentional electromagnetic interference (IEMI), natural lightning strikes, a Geo-magnetic disturbance (GMD) produced by a coronal mass ejection (CME), or other transient surges due to radiated and conducted electromagnetic interference (EMI). The system may include embedded surge protection assemblies for inline installation on electric power and communication networks with electrical and electronic devices on electrical network, powered by AC and DC sources. The inline mounting of the embedded surge suppression system may eliminate any time delay response associated with long lead wires of across the lines surge protection installation.

17 Claims, 20 Drawing Sheets

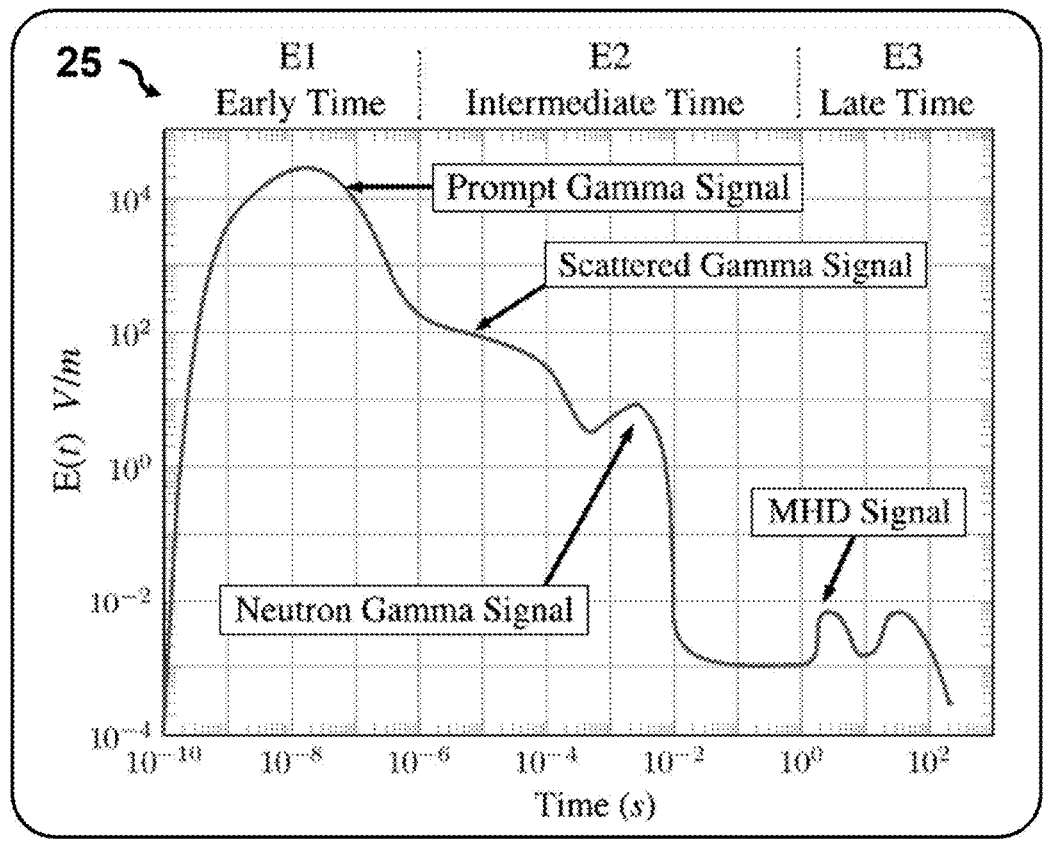

FIG. 5

30 — Early time HEMP (E1)

$E_1(t) = 0$ for $t \leq 0$
$E_1(t) = E_{01}\ k_1\ [e^{a_1 t} - e^{b_1 t}]$ for $t > 0$
where $E_{01} = 50,000$ V/m,
$a_1 = 4 \times 10^7$ s$^{-1}$,
$b_1 = 6 \times 10^8$ s$^{-1}$, and
$k_1 = 1.3$

31 — Intermediate time HEMP (E2)

$E_2(t) = 0$ for $t \leq 0$
$E_2(t) = E_{02}\ k_1\ [e^{a_2 t} - e^{b_2 t}]$ for $t > 0$
where $E_{02} = 100$ V/m,
$a_2 = 1 \times 10^3$ s$^{-1}$,
$b_2 = 6 \times 10^8$ s$^{-1}$, and
$k_2 = 1.0$

32 — Late time HEMP (E3)

$E3(t) = E_i(t) + E_j(t)$ $E_i(t) = 0$ for $\tau \leq 0$
$E_i(t) = E_{0i}\ k_1\ [e^{a_i \tau} - e^{b_i \tau}]$ for $\tau > 0$
where $\tau = t - 1$, $E_{0i} = 0.04$ V/m,
$a_i = 0.02$ s$^{-1}$, $b_i = 2$ s$^{-1}$, and
$k_i = 1.058$ $E_j(t) = 0$ for $\tau \leq 0$
$E_j(t) = E_1\ [e^{a_j \tau} - e^{b_j \tau}]$ for $\tau > 0$
where $\tau = t - 1$, $E_{0j} = 0.01326$ V/m,
$a_j = 0.015$ s$^{-1}$, $b_j = 0.02$ s$^{-1}$, and
$k_j = 9.481$

| Standard Parameter | Bell Labs (1960s) DEXP | IEC-77C (1993) DEXP | Leuthauser (1994) QEXP | VG95371-10 (1995) DEXP | IEC 61000-2-9 (1996) DEXP |
|---|---|---|---|---|---|
| t10%-90% | 4.6 ns | 2.5 ns | 1.9 ns | 0.9 ns | 2.5 ns |
| Peak Field $E_0$ | 50 kV/m | 50 kV/m | 60 kV/m | 65 kV/m | 50 kV/m |
| FWHM | 18.4 ns | 23 ns | 23.8 ns | 24.1 ns | 23 ns |
| constant | 1.05 | 1.3 | 1.08 | 1.085 | 1.3 |
| $\alpha$ (1/sec) | $4 \times 10^6$ | $4 \times 10^7$ | $2.20 \times 10^9$ | $3.22 \times 10^7$ | $4 \times 10^7$ |
| $\beta$ (1/sec) | $4.76 \times 10^8$ | $6 \times 10^8$ | $3.24 \times 10^7$ | $2.07 \times 10^9$ | $6 \times 10^8$ |
| Energy Density | 0.891 J/m² | 0.114 J/m² | 0.167 J/m² | 0.196 J/m² | 0.114 J/m² |

| Waveform parameter | First return stroke | Subsequent strokes |
|---|---|---|
| Average 10%-90% rise time | 14.5 µs | 17.4 µs |
| Average 10%-10% duration time | 244.6 µs | 83.2 µs |
| Average maximum voltage gradient | 0.55 kV/µs | 0.35 kV/µs |
| Average 10%-90% rise time of first peak | 6.9 µs | 5.0 µs |
| Average interval between first and maximum peak | 11.2 µs | 14.6 µs |

FIG. 8

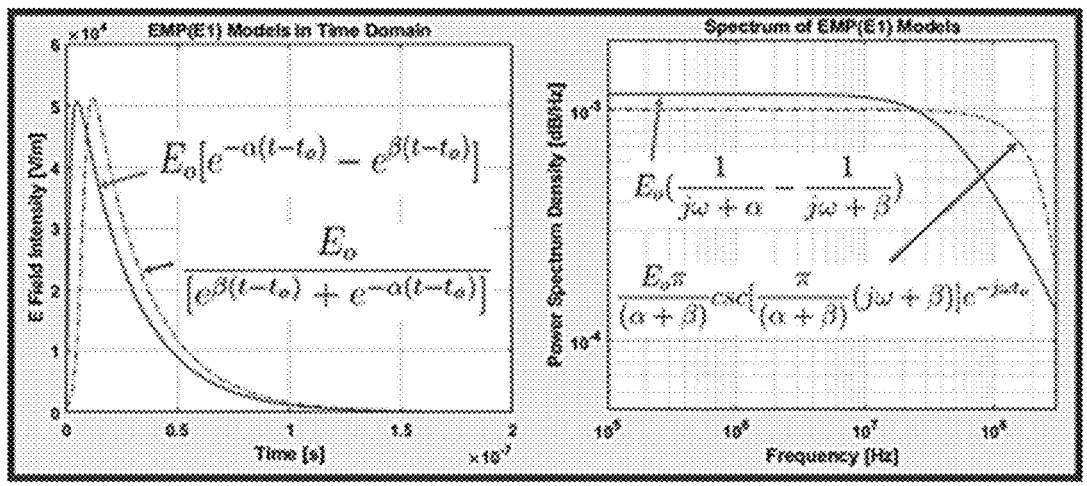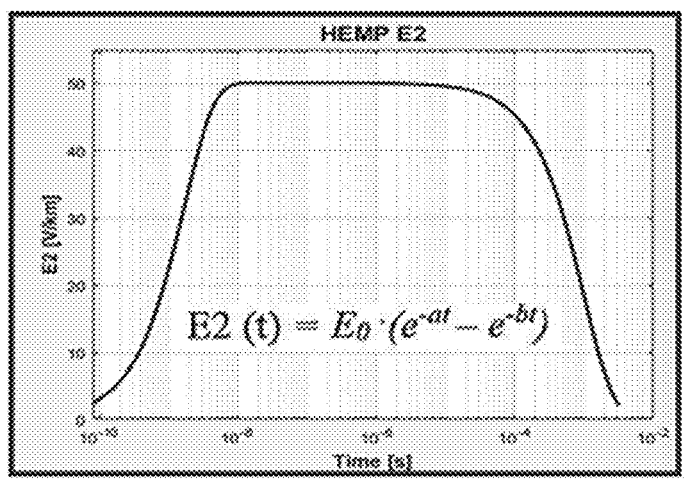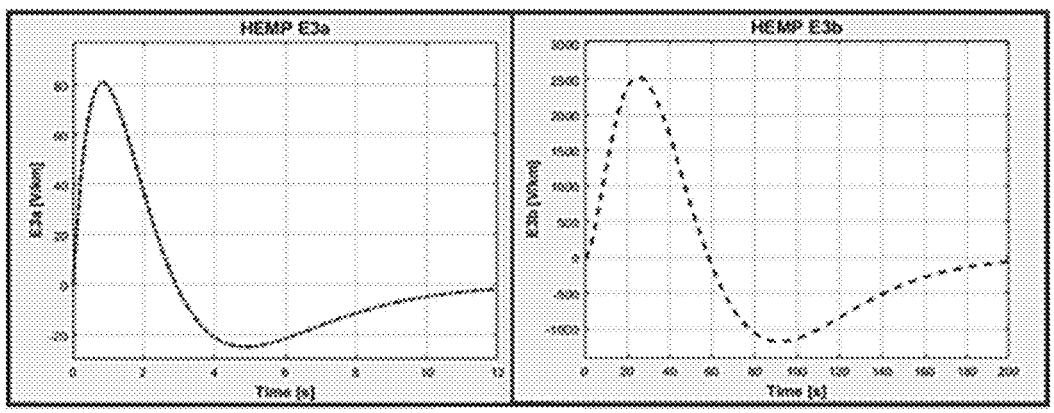
FIG. 9

METHODS AND SYSTEMS FOR PROTECTION OF ELECTRIC NETWORK FROM TRANSIENT ELECTROMAGNETIC SURGES USING INLINE EMBEDDED MITIGATION

FIELD

The systems and methods relate to mitigating impending effects of excessive transient electromagnetic energy on electrical and communication networks and protecting the connected electrical and electronic systems and subsystems from damage.

BACKGROUND

Electromagnetic energy (EM) surges are phenomena where over-voltages and current "spikes" exceeding the normal operational range occur for a short period of time. The sources of powerful surges are electrical grid circuit switching, natural lightning strikes, electromagnetic interference (EMI) coupling, electrostatic discharge (ESD), nuclear electromagnetic pulses (NEMP), non-nuclear EMP (NNEMP) based on high-power electromagnetic (HPEM) sources, narrow, wide, and ultra-wide band directed energy weapons (DEW) sources, intentional EMI such as jamming, and geo-magnetic disturbance (GMD), as summarized in block-diagram 5 in FIG. 1. The sources based on natural phenomena or technology-based sources for intentional EMI (IEMI) can impose devastating effects on electrical and electronic infrastructure. To prevent or minimize the damage due to electromagnetic disturbance, proper design and installation of EMI protection and grounding system is essential to suppress the hazardous effect of a surge, absorb the energy, and/or redirect the energy to ground.

The term electromagnetic pulse (EMP) is used to describe a transient burst of electromagnetic (EM) energy and the associated electromagnetic disturbances due to energy coupling to conductive surfaces and lines. In this document, the term "EMP" is used to describe the electromagnetic fields generated by natural or manmade sources. Frequently, the term High-altitude Nuclear EMP (HNEMP) is also used. The terms "EMP" or "HEMP" as used herein refer to the electromagnetic pulse generated by a nuclear bomb detonation, a directed energy system for high-power EM generation, other devices for IEMI or natural EMP events as a result from a Coronal Mass Ejection (CME), supernova explosion, and other cosmic phenomenon resulting in Geomagnetic Disturbance (GMD) and large scale EMP effects.

In the time domain, the EMP is presented with a waveform that describes how the amplitude of the pulse changes in time. Several specific parameters correlate the waveform to the intensity of the EMP. The real EM pulses tend to vary and to be quite complex, so their simplified descriptions are typically characterized by:

The type of EM energy coupling—radiated EM (direction of propagation, polarization, etc.), conducted, electric, magnetic, etc.

Pulse waveform: shape (rise and fall time), pulse width at half maximum (PWHM), duration, and peak amplitude.

The range or spectrum of frequencies present and the power spectrum distribution (in frequency domain).

Any EMP is associated with electromagnetic interference (EMI) which is related to the frequency content and spectral distribution and is classified as "narrowband", "wideband" and "ultrawideband" distributed in different frequency ranges. The frequency spectrum and the pulse waveform in time domain are interrelated analytically via the Fourier transform and other mathematical transformations for joint time-frequency representation (wavelets, spectrograms, etc.). An EMP typically contains energy at many frequencies from direct current (DC) to some upper limit depending on the source. Within the bandwidth, there could be multiple spectral peaks with high magnitudes. In general, the shorter the pulse (which also implies a short rise time), the broader the spread over a range of frequencies. The commonly used first-order approximation is $f_h=0.34/\tau_r$, where $f_h$ is the high frequency range (Hz) and $\tau_r$ is the rise time of the pulse (sec) from 10% to 90% of its peak amplitude.

The pictograph 10 in FIG. 2 shows an electromagnetic pulse formation generated by a high-altitude nuclear explosion in the atmosphere at high altitude according to an example of the instant disclosure. The directional wave propagation towards the Earth's surface with the electric and magnetic components is illustrated by pictograph 11 according to an example of the instant disclosure. FIGS. 1 to 18 are included to supplement the description of the physical phenomena that result in the extreme intensity of high altitude EMP and its broadband frequency content, as shown in the figures and tables. It is shown that part of an NEMP resembles the characteristics of frequently occurring natural lightning strikes, and others are reminiscent to GMD events. The man-made directed energy sources for intentional EMI have capabilities to generate more complex waveforms in time domain and variations of spectral content and distribution.

The current understanding of high-altitude nuclear EMP is based on the interactions of the blast-generated high-energy gamma rays with atoms in the atmosphere that produce electrons which interact with the Geo-magnetic field producing EM field with a Poynting vector from the burst source towards the Earth's surface as shown with pictograph 15 in FIG. 3 according to an example of the instant disclosure. The field generated by a high-altitude EMP (HEMP) has direction variation along a north-south central line and over the horizon extended effects, as illustrated with the Electromagnetic Field (EMF) Poynting vector direction with respect to the observer's location. The intensity of the pulse varies by location (latitude) due to the Geo-magnetic field distribution. Some additional relevant factors will be discussed further while the detailed specifics of the related physical phenomena are beyond the scope of this application.

An EMP event can induce voltages and corresponding currents into multiple and different electrical systems. The voltage/current magnitudes depend on the coupling of the EM field with the system (its susceptibility) and the characteristics of the EM wave (direction, polarization, frequency content, and others). The long and exposed transmission lines of wide-area power distribution grids, as well as the electrical systems of localized mini-grids, renewable energy systems, communication lines, homes' wiring, commercial buildings, and even vehicle electrical systems. Pictograph 20 in FIG. 4 illustrates the coupling of the EM energy into a transmission line at height h above the ground (Earth's surface) according to an example of the instant disclosure. The pictograph displays a few key relations of the Electric field (E) and Magnetic field (B) using the Half-space Earth model. The image is from "The Early-time (E1) HEMP and its impact on the US Power Grid" report, written in 2010 by Savage et al., Metatech Corp., and provides an excellent analysis of the physical phenomena associated with the HEMP.

Without proper protection measures, over-voltage surges can disturb, damage, or destroy components within the electrical systems in the area of impact, diminishing the operability of the electrical system or rendering it unusable until repaired. Persistent and successful protection is possible only with implementation of adequate surge shielding (e.g., Faraday cage) and/or methods for surge limiting and energy redirection and absorbing. For example, multiple methods and tools are developed and used for surge protection from EM energy associated with lightning. While the duration of a lightning strike appears very short (microseconds, μs, or $10^{-6}$ s), it is orders of magnitude longer than the duration of what is known in the literature as the E1 HEMP, which is order of nanoseconds, (ns, or $10^{-9}$ s). As shown in FIG. 2, due to its origin, a HEMP will induce effects in a very large area. Similarly, it is understood that a massive solar coronal mass ejection (CME) reaching the Earth results in GMD which has damaging effects on electrical infrastructure.

Unlike the electromagnetic radiation or transient pulses associated with common natural phenomena (lighting strikes, transmission lines overvoltage, and overcurrent surges, etc.), the HEMP comprises of more complex time and frequency domain characteristics. The HEMP is described with several stages in time following the nuclear blast. They are also known as HEMP phases or pulses of varying waveform (magnitude, duration, frequency content, etc.) illustrated with plot 25 in FIG. 5. Therefore, the HEMP is more accurately considered as a complex, electromagnetic multi-pulse event, usually described in terms of sequence of three primary components defined by the International Electrotechnical Commission (IEC) as E1, E2, and E3 phases of the high-altitude EMP (HEMP). The characteristics of these phases (pulses) of HEMP are further described in this application. The relative electric field strength of the time sequence is displayed in plot 25 in FIG. 5 using a logarithmic scale for the electric field strength E (V/m) vs Time (s). Some of the commonly used analytical expressions for the HEMP E1, E2, and E3 waveforms are given in FIG. 6 with groups 30, 31 and 32, respectively. The accepted values for the variables and coefficients in the analytical expressions are also given.

Starting in the 1960s, multiple waveform models have been developed to establish standards for testing the effects and the associated hazardous effects. The series of standards related to the description of the associated waveforms and known as IEC 77C Standards. The evolution of the unclassified standards with respect to the E1 HEMP environment can be seen in the Table 35 in FIG. 7, which displays the evolution of the waveform parameters of the unclassified HEMP E1 environment Standards.

Lightning stroke, as a common physical phenomenon in nature, is one of the main causes of the electric power apparatus failure as well as the power interruption. To assess the susceptibility, level of effects and damages of electric power equipment, standard lightning impulse, with the wave front/tail time of 1.2/50 μs is recommended by the IEC Standard and used in the impulse voltage withstand tests. However, the standard lightning impulse waveform is a statistic result obtained on the transmission lines or towers for triggering lightning, which only can be regarded as a certain kind of lightning impulse waveform. As a side note, more than 90% of the lightning strikes in nature have a negative polarity. Some additional details of the lightning associated pulse waveform characteristics are given in the Table 40 in FIG. 8.

To better analyze the waveform characteristics of induced voltages on the overhead transmission lines by natural lightning, the standard voltage waveforms are in terms of rising time, maximum voltage gradient, and the 10% to 90% rise time to peak value, overall duration time, etc. and some published results are summarized in Table 40 in FIG. 8 for a reference and comparison with the HEMP E2 characteristics. As seen in FIG. 8, the average 10%-90% first peak time for the induced voltage waveform of first return strokes is 6.9 s, and the interval between first peak and maximum peak is 11.2 s of the first return stroke. The average duration time of the induced voltage waveform of the first return strokes is 244.6 s (from 10% rise time to 10% of peak value on the fall time), and that of the subsequent return strokes is 83.2 s. The average 10%-90% rising time of the induced voltage waveform of the first return strokes is 14.5 s, and its counterpart for subsequent return strokes is 17.4 s, and induced voltages of the first return stroke are bigger than that of the subsequent ones and, therefore, the average maximum voltage gradient are respectively (0.55 kV/μs) is larger than that of the latter (0.35 kV/μs).

The most common analytical expressions for E1 HEMP are the Difference of double exponential (DEXP) and the Quotient of exponentials (QEXP) as shown in Table 35 in FIG. 7. The superimposed DEXP and QEXP plots of E1 HEMP model in time domain are presented in 45 in FIG. 9. left, and their respective spectral distributions in frequency domain are presented with superimposed plots 45 in FIG. 9, right. Plot 46 in FIG. 9 displays the waveform of E2 HEMP model and its DEXP analytical expression. Plots 47 in FIG. 9 display in time domain the waveforms associated with the two phases of E3 HEMP. The double exponential waveform for the lightning strike model has coefficient constants that reflect the slower rise and fall times (s). To express the negative polarity, the formulae is written with a negative sign for the amplitude.

The damage to electrical and electronic devices is determined by the amount of energy and the rate at which the energy is transferred to devices in the electromagnetic environment. All electrical or electronic equipment devices are susceptible to some level which may result in disturbance, malfunctions, or permanent damage under electromagnetic radiation of sufficient intensity. The frequency content of the waveform plays a major role in the coupling mechanism (the susceptibility and, respectively, the immunity of a system). The superimposed plots in FIG. 10 illustrate the power spectrum density distribution (V/m-Hz) associated with HEMP E1, atmospheric lightning strikes, and wideband IEMI (high-power microwave, high-intensity RF) generated from different directed energy sources.

The level of system vulnerability is dependent on the intensity of the EMF and the coupling of the external fields to the electrical circuits and the sensitivity characteristics of circuits components. A temporary malfunction (or upset) can occur when an electromagnetic field induces current(s) and voltage(s) in the operating system electronic circuits at levels that are within the rated upper limits of components' characteristics. Regardless the source of EMI, two principal radiation coupling modes are recognized in the literature and the relevant standards assessing how much radiated power is coupled into target systems: (1) "front door" coupling, (FDC), and (2) "back door" coupling, (BDC). The FDC is typically observed when the power radiated from the RF/HPM source is directly coupled into the communication input of electronic systems. The antenna subsystem is designed to receive and transmit RF signals, and thus providing an efficient path for the EM energy flow from the electromagnetic environment to enter the equipment and cause damage especially when the antenna's bandwidth is within the frequency range of the EM source. As seen in superimposed plots 50 in FIG. 10, the HEMP E1 has a very broad bandwidth. While the low frequencies (long wavelengths) couple to long conductor (electrical transmission line, pipelines, etc.), the higher frequencies (shorter wavelength) couple via small apertures, making effective shielding more challenging.

The BDC occurs when the electromagnetic field from the source produces large transient voltage/currents or the EM waves propagate and couple through the gaps, small apertures, fixed electrical wiring and interconnecting cables, connections to the power mains, communication cables, network and telephone copper wires, unshielded sections, and others. The BDC can generally be described as a wide-range interference at specific narrow-band susceptibility characteristics because of existing apertures and modes of coupling to cables.

Since the impinging EMP field has a broad frequency spectrum and a high field strength, the antenna response must be considered both in and out of the antenna's band. The inadvertent, unintended, or parasitic antennae are electrically penetrating conducting structures, power lines, communication cables, and others that collect EMP energy and allow its entry into a building, a device, or an enclosure. The lines of the electrical grid can be considered as antenna pathways connected to the upstream and downstream components of the grid and are susceptible to broadband frequencies, including the lower frequency (long wavelength) coupling due to the long length of the power transmission lines. Additional factors influence the level of coupling and interference: wave polarization, geolocation, ground surface conductivity, height of the wires above ground, and others. With their long length, the electrical transmission lines are also susceptible to the E3 HEMP, as further described below.

The internal electrical wirings of a building are susceptible to EMF and would couple directly to the radiated field if the building is without proper shielding. The exposed long wires or internal unshielded wires are susceptible to the radiated field. Without proper mitigation, the induced currents generate magnetic fields that couple the neighboring conductive lines and surfaces. Protection from radiated coupling of EM field is achieved by shielding equipment with a conductive enclosure. In some special cases, the whole building is a shielded structure commonly known as a Faraday cage. Because input and output cables for power and communications must be present, special methods are employed to lower and limit the propagation of the induced transients via these wired connections and their conduit openings.

Terrestrial vehicles, aircraft, and marine vessels may be considered special cases when evaluating their susceptibility to EMI. Terrestrial vehicles are poor incomplete conductive cages with different size, multiple apertures, and without direct contact with the Earth's surface. The aircraft may be modeled as a Faraday cage with limited distributed apertures. Marine vessels represent a good approximation of a Faraday cage for all equipment below deck (metal vessels) and an open exposure to all equipment above deck. The relative standards that evaluate the EM susceptibility address these differences.

A proper grounding of the electrical infrastructure is of great importance for providing passive shielding with a Faraday cage and active transient surge suppression using voltage limiting, energy absorption, and redirection. Grounding systems are well understood and used for terrestrial and naval installations. However, connection to Earth's ground is not applicable for flying aircraft and mobile terrestrial vehicles. With respect to some special cases, a conducting strap or metal chain is used on vehicles to provide a conductive path to ground. The metal marine vessels in saltwater have good contact with conductive media. There are means to provide a contact for vessel with non-conductive body.

One possible way to mitigate the effects of EMP is to provide a response in real time to an event and disconnect the protected systems by isolating them physically from long cables, wires, antennas, etc. Specifically, to protect from the damaging effects of EMP, the environment must be persistently monitored with applicable sensors and when a HEMP is detected, the appropriate isolation systems must be triggered to provide protection for the infrastructure. Given the high speed of the HEMP E1 event, this is not an easy task, has major constraints, and the very limit of abruptly disconnecting current flow especially in high-power installations.

A straightforward protection method is EMI shielding and to equip the electrical and electronic systems with means that prevent the excessive magnitude of voltage and current from reaching the electrical load and absorb and redirect the energy of the EMP. Generally, these devices are known as surge suppressors and arrestors. Most commercially available surge suppressing devices are designed and built to offer protection to lightning with micro-seconds response times. This is not sufficient for protection from the E1 HEMP with a few nanoseconds rise time and from IEMI with variable characteristics (rise time/frequency content and repetition rate). It is important to note that localized, small capacity surge protection devices exist and are commercially available. Following up the standards specifications, the surge protection devices (SPD) are implemented as type 1, 2, and 3 with respect to the point of installation. SPDs for a split-phase 120 VAC and for three phase 277/480 VAC system are manufactured by different vendors. These SPDs have different technical specifications with focus on current and energy handling capacity. Most of the commercially available transient surge protection systems are designed and implemented to be connected across the AC power lines, commonly referred to as a T-tap type connection, which does not provide in series installation with the AC power lines (like the high-power filters, for example). A generalized view of surge protection installation across the power lines is shown with pictograph 55 in FIG. 11.

Across the lines installation of surge suppression systems does not affect the normal operation of low frequency AC power lines (60 Hz or 50 Hz). However, it is not the optimal implementation with respect to transient suppression. While it offers the advantage of a less complex manufacturing and easier connections, across the lines installation results in transmission lines configuration topology that is not optimal when the short HEMP E1 and E2 pulses with high frequency spectrum are considered. At high frequencies, the propagation of the EM wave depends on multiple factors. The high frequency content of an EMP (100s MHz) is governed by the wave propagation dependances on the characteristics of the transmission line and any topological, static, or dynamic changes of the transmission line including its characteristic impedance, source, and load impedance. While a properly designed and implemented transient suppression system (TSS) will mitigate the surge voltage and current, across the line installation introduces change of the characteristic impedance of the transmission line and reflected pulse from the TSS back to the power lines. A portion of the transient surge pulse propagates toward the SPT, and a portion continues propagation towards the load. Depending on the length of the connecting wires, after a round trip delay the portion of the pulse that reaches the TSS is reflected to the power lines after being suppressed by the TSS. The reflected wave form is superimposed on the incoming waveform. This is illustrated with superimposed simulation plots 56 in FIG. 11 for an example T-tap installation across the lines case with 0.6 m (~2') connection leads at location 1.5 m (~5') in front of the electrical load. The propagation speed (and respectively the propagation delay) on a transmission line is frequency dependent. Reflections from TSS also have a negative magnitude content due to the changed load impedance of TSS after the triggered response of the surge suppression components. As shown in the example, the incoming surge pulse propagates further down the power line towards the electrical load during the propagation time delay from the point of connection on the power lines to the TSS and back to the power lines connection point.

Pictograph 60 in FIG. 12 displays an inline installation of a transient surge suppression system (TSS) which is used in the methods and systems according to an example of the instant disclosure. This installation does not affect the normal operation of low frequency AC power lines (60 Hz or 50 Hz) and provides the advantage with respect to the high frequency content of the transient surges. In comparison with across the lines connection, the inline installation does not result in a T-section (a tab) of the electrical transmission lines. The high frequency content of an (300 MHz and higher for HEMP E1 and GHz for HIRF) is governed by the wave propagation dependances on the characteristics of the transmission line and any topological, static, or dynamic changes of the transmission line including its characteristic impedance, source, and load impedance. Superimposed plots 61 in FIG. 12 display simulation example to illustrate an immediate response of the TSS (the absence of propagation delay). The waveform at the load is almost identical to the waveform at the output of the TSS with minor losses and a propagation delay that depends on the distance of the load from the TSS's inline installation point (refer to the legend in FIG. 12).

The inline installation protective means based on the current methods and systems, use components with very high resistance during normal operation, minimal parasitic capacitance, and lead inductance of the components used. The important points to note, as illustrated in pictograph 55 in FIG. 11 (across the line installation) and pictograph 60 in FIG. 12 (inline installation) are:
  the difference in the TSS's response time
  The difference of the transient surge energy propagating
    to the electrical load (usually referred to as residual
    current end respectively, residual energy).

Pictograph 66 in FIG. 13, presents a notional diagram of a hybrid TSS with primary, secondary, and tertiary protection assemblies. There are multiple components available to the designer of a TSS to address the specific needs and requirements. The complete list of components, including transient voltage suppressors (TVSs), metal oxide varistors (MOVs), gas discharge tubes (GDTs), other solid state and nonlinear components based on semiconductors (i.e., Si, Ge), compound semiconductors (i.e., SiC, GaN, GaAs) and metamaterials, mechanical, electrical and ionization discharge devices (IDDs), and combinations thereof, is beyond the scope of this application. Plot 65 in FIG. 13 illustrates that the voltage threshold of the primary protection is above the triggering threshold level of the secondary protection.

The block diagrams 55 in FIG. 11, 60 in FIGS. 12, and 66 in FIG. 13, refer to the transient suppression systems (TSSs) as assemblies of transient voltage suppressors (TVSs), metal oxide varistors (MOVs), gas discharge tubes (GDTs), glass GDTs, avalanche transistors (ATs), spark gap protectors (SPG) and thyristor surge suppressors (TSS), other solid state and nonlinear components based on semiconductors (i.e., Si, Ge), compound semiconductors (i.e., SiC, GaN, GaAs) and metamaterials, mechanical, electrical and ionization discharge devices (IDDs), and combinations thereof. The TVSs have a characteristic fast response time but relatively limited energy absorption capacity. The MOVs and GDTs provide high-capacity energy shunting capability. With the continued advancement of material sciences, optimized technologies produce components with better parameters and new components that provide more advanced solutions for TSSA implementation. In this regard, the wide bandgap semiconductors, and the development of compound semiconductors with groups III-IV elements are very promising to provide new components with fast response and energy handling capacity.

The notional top view 72 at the bottom in FIG. 14, shows an example multiple electrical and electronic system and subsystem of a modern vehicle. In the middle of FIG. 14, a very high-level block diagram 71 of main vehicle subsystems for power source, regeneration, and distribution is presented. On the top of FIG. 14, example plots 70 are shown for the type and magnitude of the most frequent voltage surge events associated with operation of a vehicle: crank, noise, load dump, vehicle jump start, incidental battery polarity reverse. These possible events and the possible voltage and current surges must be considered in addition to external EMI. For example, the negative polarity due to battery reverse and operational noise. As illustrated with multiple vehicle subsystems in the top view 72 in FIG. 14, there are multiple fuse boxes at different locations and distributed on different electrical and electronic subsystems.

In FIG. 15, the block diagram 100 of typical TSS installation on a vehicle is presented. The electric source is vehicle battery 102, which is usually 12 VDC but 24 VDC and higher voltage been used with more complex battery management system. The neutral tab of the battery is connected to the vehicle chassis 107 and provides the negative side (ground) for all electrical and electronic loads. In general, the power distribution has a main fuse, or a circuit breaker, and every load (or group of similar loads) has a properly sized fuse located in a fuse box. As shown in FIG. 15, every wire is susceptible to external EMI radiation and conductive transients (105 and 106). Also shown in FIG. 15 is TSS 104 installation across the battery 102 terminals with a fuse 103 in the positive lead wire, as required by the standard.

On the bottom left of FIG. 15, the top view of an example vehicle fuse box 109 is shown with the typical sockets 110 for blade fuses. As shown on the bottom of FIG. 15, the blade fuses 115 have different current capacities and multiple sizes are commercially available and used. Without the loss of generality, the block diagram 100 in FIG. 15 may represent the common installation of TSS in passenger cars, tracks, utility vehicles, and small size marine vessels.

In FIG. 16, two block diagrams 200A and 200B are presented with subsystems annotation that is used during the detail explanation of the diagrams. The diagrams illustrate the current manufacturers' designs and installation of TSS on vehicles. Namely, a transient suppression device (TSD) with a plurality of transient voltage suppression components is connected to the positive and negative tabs of the vehicle battery and a third connection lead wire is connected to the vehicle's chassis. The length of the connection leads is 3-4 feet and even longer, to provide convenience for installation.

The deficiencies of such implementations were given previously in this application and were illustrated in FIG. 11 with the across the lines TSS installation. The equivalency of the current commercially available vehicle SPD to a T-tab installation across the lines is illustrated with the simplified block-diagram 200B at the bottom of FIG. 16. The shortcomings and limitations of this approach are given below.

In FIG. 17, two block diagrams 300A and 300B are presented with subsystems annotation that is used during the detail explanation of the diagrams. Block diagram 300A in FIG. 17 illustrates an example implementation of transient protection component embedded with a fuse in a fuse box 306 and is used on one of lines 307 to protect dedicated electrical loads 308 and 309 powered by electrical network 310. This new design of a transient suppression device (TSD) is embedded with a dedicated fuse for a given load powered by the vehicle power distribution network. This is the equivalent of an inline installation of TSS with the described advantages and illustrated in FIG. 12. Further description and advantages are given below. Block-diagram 300B illustrates the same concept with plurality of fuse boxes 323 and 327 protecting electrical loads 325 and 326.

In FIG. 18, on the left side on the top, the front, bottom, and side views of a standard blade fuse 401 are shown. On the left side bottom, a commercially available fuse expansion tap is shown with an illustration of how it is used to add a fuse. FIG. 18 sets the background for the implementation and utilization of an example method for embedded inline TSS. As illustrated on the left side in FIG. 18, one common way for adding an additional fuse to an existing fuse box is achieved by removing an existing fuse and plugging a fuse expansion tap 407 with matching blades 408 in the socket of the removed fuse. The previously removed fuse is plugged back in one socket of the expansion tap 407 and an additional new fuse is inserted in the second socket. The second socket has a lead wire 409 that connects to the positive pole of a new load for which an additional fuse is needed.

On the top of the right side in FIG. 18, the front view of an example embodiment of two-blade transient suppression device (BTSD) 410 is shown. The BTSD has two blades 414 that match the standard fuse blade dimensions and a lead wire 412. The embedded fuse is between the two blades 414. Identical to a standard fuse blade, one of the blades is connected to a vehicle positive power line and the second blade is connected to the positive pole of a load associated with the fuse. The surge protection component is connected between the fuse end that is in connection with the electrical load and a lead wire 412. On the right side of FIG. 18, an example utilization of a BTSS 415 is illustrated with its insertion in a second socket of an expansion tap 417. It is shown how instead of adding a second blade fuse, the BTSD 415 is plugged into the second socket of the expansion tap 417. With this example embodiment, the direct inline TSS installation utilizes an existing fuse box on a vehicle and an example blade design embodiment of TSS 410. The wire lead 418 of the fuse expansion tap 417 is connected to the positive pole of an electric load following the standard way of adding a fuse. The wire lead 412 of BTSD 410 is connected to a negative terminal of the fuse box, providing surge protection between the positive and the negative power lines with surge protection installed in series with a fuse as required by the standards.

In FIG. 19, 420 on the left side, the front, bottom, and side views (422, 421, and 426, respectively) of an embodiment of an example BTSD are shown. The front view 422 displays the example two-blade transient suppression device (BTSD) with its embedded built-in fuse. This example design BTSD embodiment can be used to directly replace a blade fuse 423 in a fuse box socket adding inline surge protection. The embedded SPD is connected to the fuse side that is respectively connected to the positive pole of the electrical load. The output end of the embedded SPD 427 is connected to the negative terminal of the fuse box with its lead wire 426. On the right side in FIG. 19, 430 displays one more example embodiment of embedded TSS with a fuse for inline installation. The front 432, bottom 431, top 435, and side 437 views are shown. This embodiment eliminates the connecting lead wire for the embedded TSS, adds a third blade 434, and a status monitoring indication 439. The connecting lead wire of this embodiment is replaced with a third blade 434 as shown in 432 in FIG. 19. This embodiment adds advantages in the performance of the TSS which will be discussed later in this application. Obviously, this 3-blade embodiment requires a 3-blade socket for its installation. The distances between the central blade to the end blades are different to assure correct insertion in the socket.

In FIG. 20, 440 displays the top view of a fuse box 441 with two rows of 3-blade sockets 448 which are used with 3-blades, embedded BTSD (3BTSD). As can be seen in FIG. 21, the 3-blade sockets fuse box has power busses with a terminal 447 for connection to the battery positive and terminal 443 to the battery negative poles. It has terminal connections to the positive 445 and negative 442 poles of the electric loads associated with the fuse box. In comparison to a standard 2-blade sockets fuse boxes (an example shown in FIG. 15), the 3-blade fuse box has a power bus that connects one of the blades of the 3BTSDs to the negative terminal of the fuse box (respectively the negative pole of the load). The second side of the embedded TSD is internally connected to the output side of the embedded fuse of the 3BTSD and respectively to the positive terminals of the fuse box connected to a dedicated load. The acronym 3BTSD is used further in the text of this application for this example embodiment.

On the right side of FIG. 20, the front view 449 of the 3BTSD is shown aligned with one 3-blade socket. This illustrates the easy installation of 3BTSD and the easy replacement, if necessary. In this regard, the status indicator on the top of the 3BTSD is a useful functional characteristic and practical utility.

In FIG. 21, 450 on the left side displays the front 452, bottom 451, and side 457 views of an embodiment of an example 3BTSD. The 3-blade embodiment shown in FIG. 19 has all three blades longitudinally on the same axis. The third blade of 3BTSD 450 for connection to the negative pole of the power is position off axis of the two fuse blades instead longitudinally on the same axis, as can be seen in the front, bottom, and side views. This is an example embodiment that provides more compact implementation of a 3BTSD, and it is applicable to inline installation like standard two-blade fuses. For clarity, this embodiment is forward referred to as 3'-blades 3'BTSD (2 on axis+1 off axis).

On the right side in FIG. 21, an inline fuse holder 458 with three-blades socket is shown. After insertion of a 3'BTSD, the fuse is connected between the two inline blade sockets 461 making a connection from the power source towards the positive pole of a load on the power line protected by the fuse. The TSS component is connected after the fuse (the load end of the fuse) to the third blade socket 464 which respectively is connected to the negative power supply line by the negative power bus of the fuse box. In this regard, the inline installation of a TSD with an embedded fuse is directional: an input from the power source and an output towards the load as indicated with the triangle marks on the 3-blade fuse holder. It is important to note that with the off-axis position of the third blade provides correct insertion of the embedded 3'BTSD.

In FIG. 22, a 3D model view 470 of one example embodiment of a fuse box with 3-blade sockets is displayed for the 3BTSD with the blades on the same axis (430 in FIG. 19). On the right side, the annotated assembly subcomponents are shown to illustrate further the integral components. On the bottom of FIG. 22, a 3D model view 480 of one example embodiment of a fuse box 491 for the 3'BTSD is displayed for the example embodiment with a third blade off-axis (450 in FIG. 21). The annotated assembly subcomponents are shown on the left side of 480. The fuse box 491 for 3'BTSD is narrower due to the form factor of the 3'BTSD. In FIG. 22, additional space 475 and space 494 in the fuse boxes are shown and are used to incorporate additional transient suppression components, status monitoring, display, and communication. Similarly, when necessary, a fuse box with larger additional space is provided using an extended bottom bases 479 and 485 of the fuse box.

In FIG. 23, 600 on the upper left side displays a 3D drawing of a T-tap quick wire-splice connector 601 with a segment of a wire 602 before installation and a front view 603 of the T-tap wire-splice connector installed on a wire. A 3D drawing of a male spade connector 604 matching the T-tap connector 601. It is important to note that T-taps are commercially available for different gauge wires and different current/voltage ratings, respectively. They are color coded red for 22-16AWG, blue for 16-14AWG, and yellow for 12-10AWG. The popular current ratings are from 10A to 25A.

In FIG. 23, on the right side, two example embodiments of embedded inline SPD are presented. On the top, SPD 608 has three male spade connectors 605, 610, and 611. The upper connectors 605 and 610 are used to insert the TSD inline on the positive power line. The third connector 611 is used to connect to a T-tap on the negative power line (or the chassis of a vehicle). On the bottom of FIG. 23, SPD 612 has two wire leads 613 for inline splicing on the positive power distribution line. The preassembled T-tap quick connector 618 is used to connect to the negative power distribution line. Further details are given below.

In FIG. 24, 700 displays additional example embodiments. In top left corner of FIG. 24, a top view of an example embodiment of embedded TSD 701 for inline installation is shown designed with narrow cross section enclosure for inline installation in constraint spaces. Short lead wires 705 and 706 are for connections with line screw terminals or other splicing techniques. An embodiment of embedded TSD 707 is displayed with integrated connectors 714 and 719 for quick inline insertion installation using a popular connector DB9. A Micro-C connector 720 is also shown with its annotated pins further described below in this application. An example of installation of a TSD 727 at an end point of a network is illustrated with integrated matching connectors 726 and 728 and a terminating module 729 with bus terminating impedance 730.

Many new quick-connect techniques are becoming available. For example, the "Posi-Tap" is an alternative quick connect option. The important point is the installation of a TSD directly inline near the load providing a response without delay, eliminating lead wires, and preventing induction of transient current between the TSD and the load.

The methods and systems discussed herein provide protection to electrical and electronic devices connected to an electrical infrastructure network without interfering with the performance of the protected system. The embedded TSS protects the connected electrical and electronic loads by limiting and absorbing the energy of the transient surge pulses before they can reach the protected infrastructure. The system can be extended to provide an enhanced protection from EM energy interference with AC and DC electrical networks. As an example, an emphasis is given on the advantages of the inline BTSD connection, in general, and more specifically, inline load dedicated distributed TSS.

The methods and systems provide for protection from the effects of excessive EM energy with flexibility of installation and inline interconnection. This hybrid technology approach is based on appropriate combination of technology elements to form surge protection assemblies which are embedded as encased devices with mounted blades for connection to already existing fuse boxes. The input and output interconnection points are internally connected to standard blades to be inserted directly in commercially available sockets. The direct connection to power and communication buses provides surge response without a delay associated with wire propagation speed. The easy inline installation of embedded fuse-surge protection provides utility for enhanced distributed protection on multiple points of the electrical network.

With respect to vehicles and other and small-size electrical utility devices with power distribution lines (mini-grid equipment, electrical generators, etc.), the system provides several advantages. Each load has a dedicated properly sized fuse and surge protection capacity level. This is in complete opposite to a single across-the-lines installation of a high capacity TSD with lead wires (for example, close to a vehicle battery or close to an electrical panel). The connecting long-lead wires of commercially available devices act as additional radiation induction pathways. In such regard, for vehicles for example, the described system enhances and augments the typical at-the-battery installation with a distributed at-the-point-of-interest load-specific SPD. Further description and details are given below in this document.

SUMMARY

Embodiments of the invention are defined by the claims below and not solely by this summary. A high-level overview of various aspects of the invention is given here for that reason, to provide an overview of the disclosure, and to introduce a selection of concepts that are further described in the Detailed Description section below. This summary is not intended to identify key features or essential features of the claimed subject matter, nor is it intended to be used as an aid in isolation to determine the scope of the claimed subject matter. In brief, this disclosure describes, among other things, a system and method for enhanced protection of electrical and electronic systems from electromagnetic pulse-induced electrical transient surges induced by the E1, E2, and E3 components of an electromagnetic radiation complex multi-pulse, generated by the detonation of a nuclear weapon at high altitude (HEMP), intentional electromagnetic interference (IEMI), natural lightning strikes, a Geo-magnetic disturbance (GMD) produced by a coronal mass ejection (CME), or other transient surges due to radiated and conducted electromagnetic interference (EMI).

In one aspect, the system and method for suppressing electromagnetic pulse-induced electrical system surges comprises embedded limiting, absorbing, switching and shunting assemblies including transient voltage suppressors (TVSs), metal oxide varistors (MOVs), gas discharge tubes (GDTs), glass GDTs, avalanche transistors (ATs), spark gap protectors (SPG) and thyristor surge suppressors (TSS), solid state switches, other solid state and nonlinear components based on semiconductors (i.e., Si, Ge), compound semiconductors (i.e., SiC, GaN, GaAs), mechanical, electrical, and ionization discharge devices (IDDs) as bulk components, distributed metamaterials, and combinations thereof. The protecting assembly for limiting, absorbing, switching, and shunting, is directly connected inline without interference with the normal operation of power transfer to the respective electrical loads and with an integrated fuse as required by the standards. In a similar fashion, the embedded TSD can be utilized for communication networks with inline installation at a source, at an end node, or at a channel midspan. The method for EM surge protection is implemented in such manner that voltage amplitudes between any two lines of an AC and a DC power distribution network that exceeds a predetermined level are limited, absorbed, switched, and shunted by at least one of pluralities of protecting assembly to prevent the magnitude of surge voltage and current (respectively, energy) from exceeding a predefined threshold level. By limiting the voltage amplitude, respectively the current of the connected electrical power devices is also limited preventing a damaging effect of a transient voltage surge. Long duration surges associated with HEMP E3, and GMD are mitigated with TSSAs that include surge duration monitoring and soft switch disconnect of load.

In another aspect, the inline mounting of the embedded surge suppression system eliminates delay response time of the protecting assemblies, and the allowable voltage amplitude level of the protecting assemblies are selected and combined to achieve a predefined desired response time and protection level capacity to react to and mitigate the E1, E2, and E3 components of a complex multi-phase EMP generated by detonation of a nuclear weapon at high altitude (NHEMP). In a similar aspect, the response time and the voltage limiting and energy handling capacity of the plurality of inline embedded protecting assemblies responds to electromagnetic energy surges induced by a GMD, IEMI, or other EMI events.

In a further aspect, the presented method and embedded inline TSS systems provide surge protection of AC and DC power networks with ability to utilize plurality of interface types for inline connection. In alternative embodiments, the systems are configured to protect electrical systems operating at different AC or DC voltages. The surge suppressing system embodiments based on the example method are implemented as compact embedded component for ease of installation, such as direct replacement of a blade fuse in case of use on a vehicle, for example. In a different embodiment, the embedded TSD has multiple components mounted on a PCB and sealed with electrically insulated, thermally conductive compounds with connectors for direct inline installation. This provides the capability for distributed inline installation on a network at a point of interest close to a protected device. Status indicators facilitate the maintenance of the electrical network. The embedded TSD offers the ability to use any standard connectors and inline insertion installation at a point of an existing interface on standard industrial communication CANBUS networks, for example. An additional auxiliary ground connector is provided, when necessary, for augmented grounding. Two or more TSDs can be utilized on a long length wire to increase the surge energy handling capacity and an immediate response at point of EMI impact. Furthermore, mechanical, and waterproof sealed embodiments can be installed inline and used on electrical power networks in more demanding environments.

These and other aspects, features, and benefits of the present disclosure will become apparent from the following detailed written description of the preferred embodiments and aspects taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 5 is a plot representation in time domain of the complex high-altitude electromagnetic multi-pulse event with a sequence of three primary E1, E2, and E3 phases of the HEMP according to an example of the instant disclosure.

FIG. 6 is a tabulated summary of the commonly used analytical expressions for the HEMP E1, E2, and E3 waveforms with the model parameter values according to an example of the instant disclosure.

FIG. 7 is a table with the parameter values for the HEMP E1 waveform and their changes as the models and standards describing the HEMP E1 environment have evolved according to an example of the instant disclosure.

FIG. 8 is a table of lightning strikes waveform characteristics according to an example of the instant disclosure.

FIG. 9 presents the plots of the Difference of double exponential (DEXP) and the Quotient of exponentials (QEXP) models of E1 HEMP in time domain (left) and their respective spectral distribution in frequency domain (right) according to an example of the instant disclosure.

FIG. 9 displays the waveform of the E2 HEMP and its analytical expression according to an example of the instant disclosure.

FIG. 9 displays the waveforms associated with the two phases of E3 HEMP according to an example of the instant disclosure.

FIG. 18 shows how a BTSD, with a form factor matching a standard two-blade fuse, is used with a commercially available fuse expansion tap to provide a transient voltage protection to an electrical load protected by the fuse according to an example of the instant disclosure.

DETAILED DESCRIPTION

Figure 1:
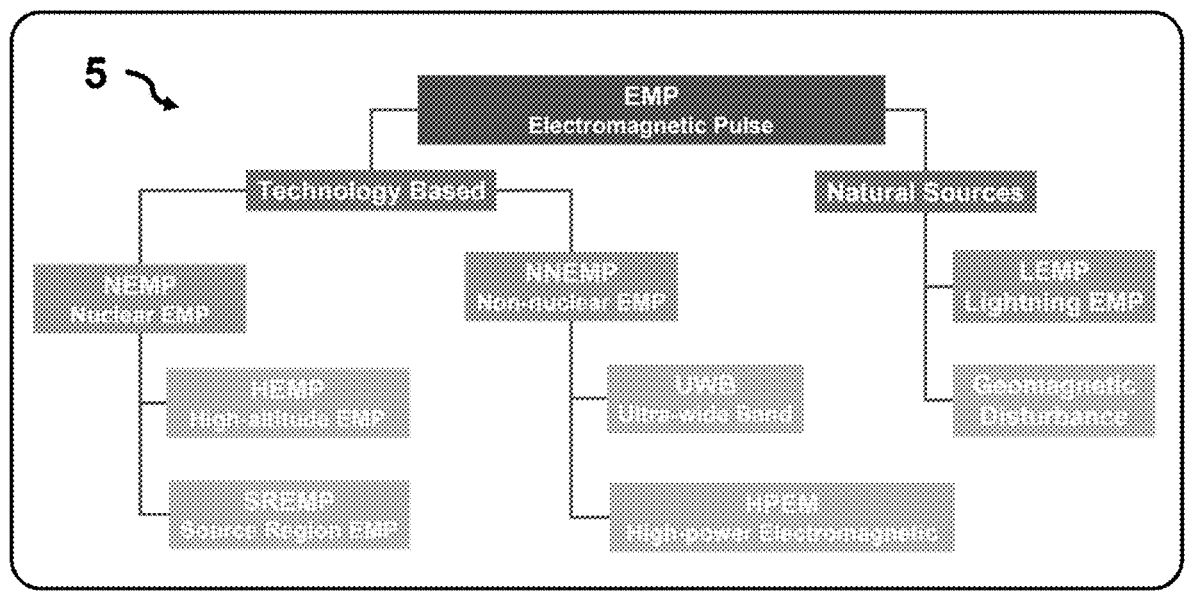
FIG. 1 is a view diagram of the sources of powerful electromagnetic surges, referred to as electromagnetic pulse (EMP), such as electrical grid circuit switching, natural lightning strikes, electromagnetic interference (EMI) coupling, electrostatic discharge (ESD), directed energy weapons (DEW) sources, nuclear electromagnetic pulses (NEMP), non-nuclear EMP, and geo-magnetic disturbance (GMD) according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may affect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense but is made merely for the purpose of illustrating the general principles of the invention, since the scope of the invention is best defined by the appended claims.

It will be understood that, although the terms "first," "second," etc., as well as "primary", "secondary," etc., may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an", and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The characteristics of an electromagnetic pulse (EMP), in general, and high-altitude nuclear EMP (HNEMP), in particular, is discussed in the context of traditional electrical environments and setups before described in detail and regarding the protection of multiplicity of high power electrical and electronic systems.

Figure 2:
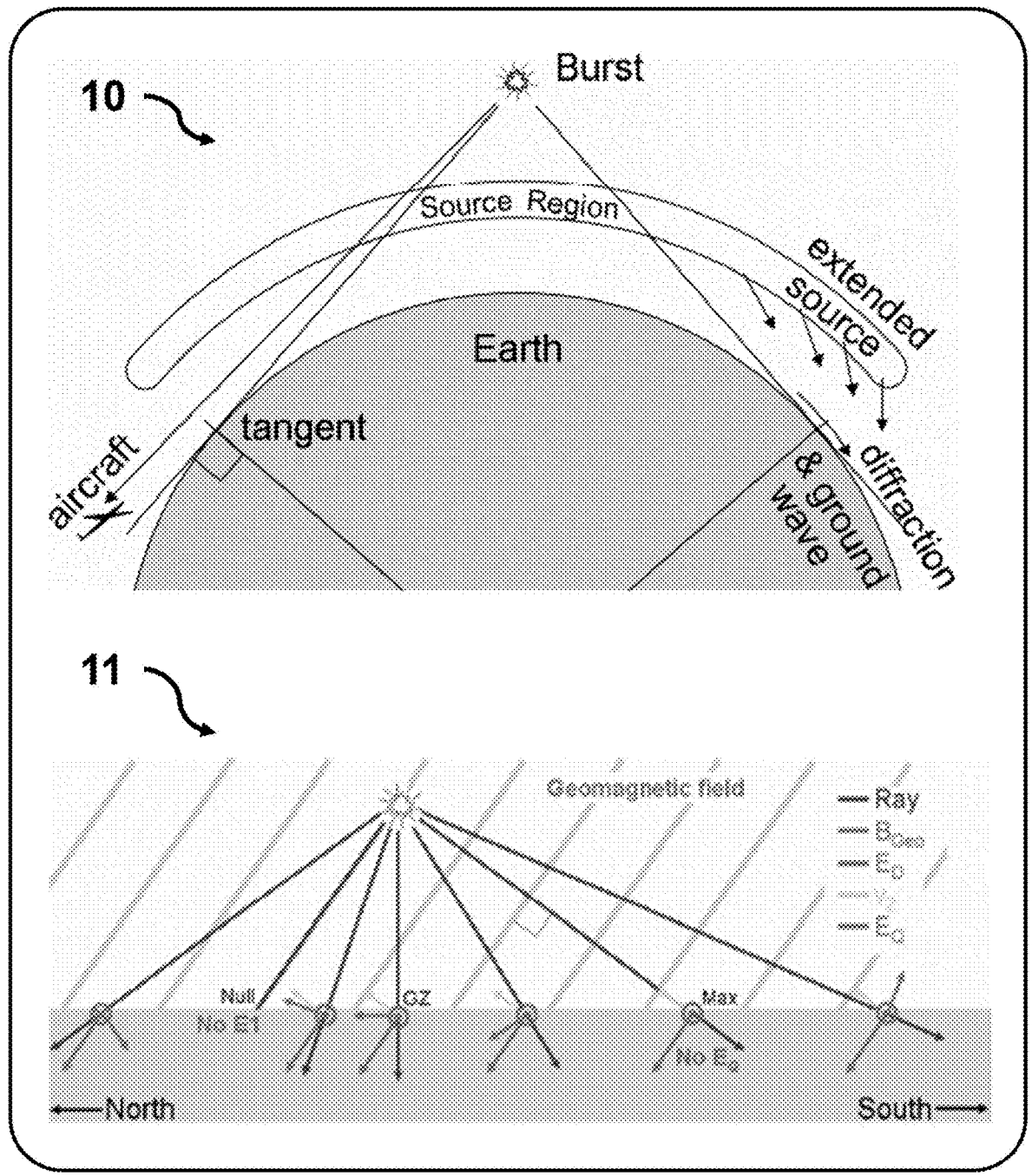
FIG. 2 is a pictograph of an electromagnetic pulse generated by a high-altitude nuclear explosion (HEMP) and the formation of the Source region in the atmosphere according to an example of the instant disclosure.
Figure 3:
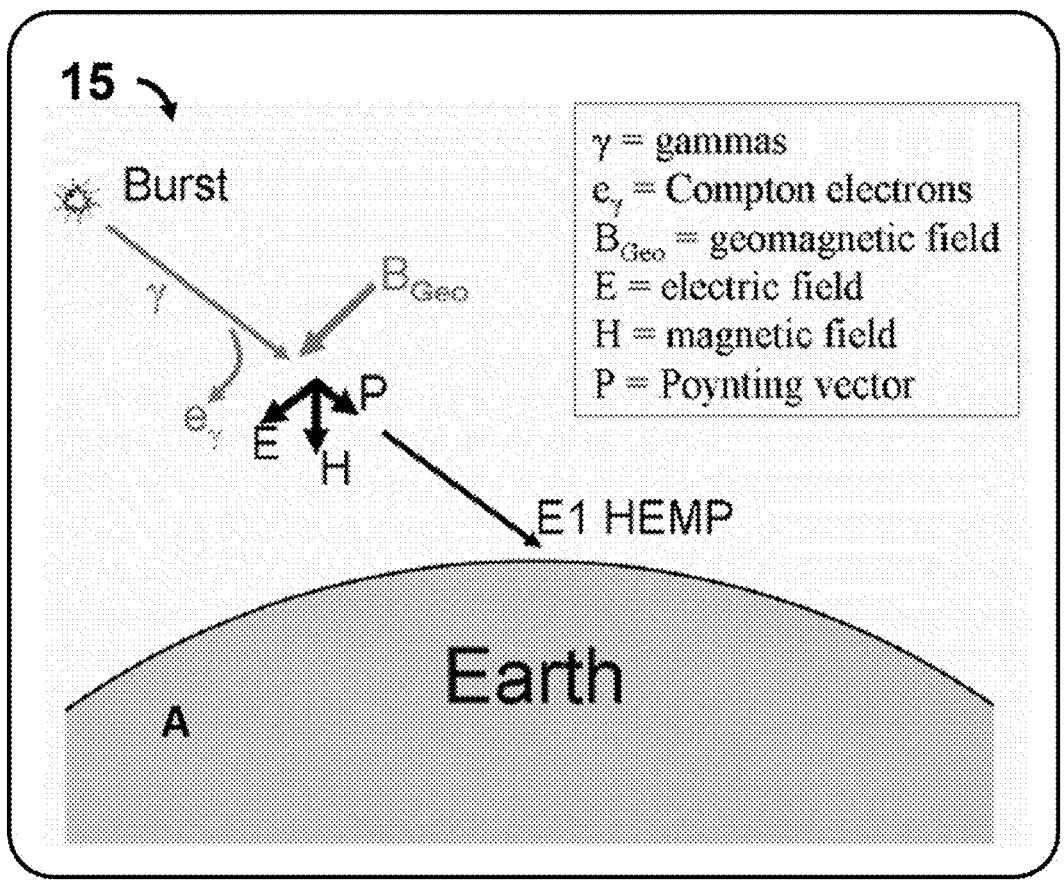
FIG. 3 is a pictograph of a nuclear burst high-altitude location and the Electro-magnetic Field (EMF) Poynting vector direction with respect to the observer's location according to an example of the instant disclosure.
Figure 4:
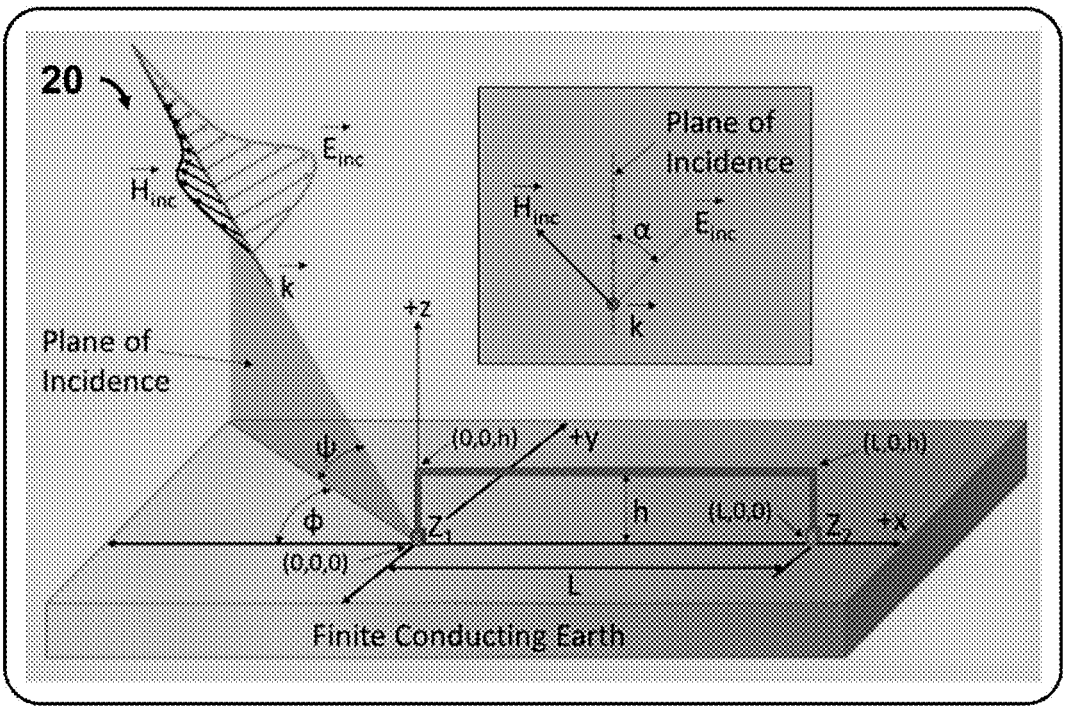
FIG. 4 illustrates the EM wave and its E (electric) and H (magnetic) vectors in the plane of incidence at a transmission wire at height h. The three associated angles (a, φ, and ψ) are indicative for the importance of 3D monitoring and evaluation of the Electromagnetic field (EMF) according to an example of the instant disclosure.

As initially presented above and summarized in block-diagram 5 in FIG. 1, an EMP is associated with naturally occurring or man generated events. An EMP generated by detonation of a nuclear weapon comprises a sequence of waveforms due to the multiple and complex interactions of the product of the nuclear blast with Earth's atmosphere and geomagnetic lines (as shown in pictographs 10 and 11 in FIG. 2 and pictograph 15 in FIG. 3). Pictograph 20 in FIG. 4 illustrates the coupling of the EM energy into a transmission line at height h above the ground (Earth's surface) according to an example of the instant disclosure. The pictograph displays key relations of the Electric field (E) and Magnetic field (B) using the Half-space Earth model. Multiple phases (pulses of varying duration) are used to describe/represent the HEMP more accurately. In this regard, the HEMP is considered a complex, electromagnetic multi-pulse, usually described in terms of three primary components defined by the International Electrotechnical Commission (IEC) as E1, E2, and E3. The three phases of the HEMP are presented with log-log plot 25 in FIG. 5. The nature of these pulses is described below.

The E1 component of the complex multi-pulse is produced when gamma radiation from the nuclear detonation knocks electrons out of the atoms in the upper atmosphere. The electrons begin to travel in a generally downward direction at relativistic speeds (i.e., at more than 90 percent of the speed of light). In the absence of a magnetic field, the displaced electrons would produce a large pulse of electric current vertically in the upper atmosphere over the entire affected area. However, the Earth's magnetic field acts on the electrons to change the direction of electron flow so that it is at a right angle to the geomagnetic field. This interaction of the Earth's magnetic field and the downward electron flow produces a very brief, but very high magnitude, electromagnetic pulse over the affected area.

The process of gamma rays knocking electrons from the atoms in the mid-stratosphere ionizes that region, causing it to become an electrically conductive ionized layer, that limits and blocks the further expansion of the electromagnetic signals and causing the field strength to saturate at about 50,000 volts per meter (50 kV/m). The strength of the E1 HEMP depends upon the altitude of the detonation of the nuclear device and the atmosphere conditions and the intensity of the gamma rays produced by the weapon. of the more detailed explanations of the undergoing physical interactions are beyond the scope of this document and may be found elsewhere.

The interaction of the very rapidly moving negatively charged electrons with the magnetic field radiates a short duration, intense pulse of electromagnetic energy. The pulse typically rises to its peak magnitude in about five nanoseconds (5 ns) and decays within hundreds of nanoseconds (200 ns-500 ns, depending on the level of intensity used for measurement). The given values may vary based on location and distance to the blast point. According to the most recent IEC standard update, the E1 pulse has a rise time of 2.5 ns±0.5 ns (from 10% to 90% amplitude levels), reaches peak value of 50 kV/m in 5 ns, and has a pulse width at half maximum of 23 ns±5 ns. The analytical expressions and accepted values for HEMP E1, E2, and E3 are respectively summarized in 30, 31, and 32 in FIG. 6 and table 35 in FIG. 7).

Thus, the E1 component is a short-duration, intense electromagnetic pulse capable of inducing very high voltages in electrical conductors. That induced high voltage typically exceeds the breakdown voltage of common electrical system components such as those used in computers and communications equipment, degrading and/or destroying those components. Because the E1 component pulse occurs so quickly, most commonly available lightning surge protectors are unable to respond and suppress the surge induced into an electrical system by an E1 pulse.

The E1 component is further characterized in certain regulatory standards. The table 35 in FIG. 7 gives the characteristic values of the E1 phase of the HEMP. There are several HEMP environment standards, and some are classified such as DoD-STD-2169. Others are public knowledge such as IEC STD 61000-2-9, MIL-STD-188-125-1, MIL-STD-461G, and MIL-STD-464D. The first HEMP related standard was created by Bell Labs in the 1960s. Since then, revisions have been made as can be seen from the table 35 in FIG. 7. In general, the parameter values do not present geolocation variations with respect to altitude, distance, atmosphere conditions, field vectors direction, and local Earth surface properties, which impact the formation, propagation, and reflection of the EM field.

The standard lightning impulse waveform is a statistic result obtained on the transmission lines or towers for triggering lightning, which only can be regarded as a certain kind of lightning impulse waveform. Some details of the lightning associated pulse waveform characteristics are given in the table 40 in FIG. 8. To better analyze the waveform characteristics of induced voltages on the overhead transmission lines by natural lightning, the standard voltage waveforms are in terms of rising time, maximum voltage gradient, and the 10% to 90% rise time to peak value, overall duration time, etc. and some published results are summarized in table 40 in FIG. 8 as a reference and comparison with the HEMP E2 characteristics.

The combined HEMP timeline based on analytical expressions is provided in IEC 61000-2-9 and is given in log-log plot 25 in FIG. 5. Two of the well accepted and used analytical expressions of HEMP are provided in IEC 61000-2-9 and given for reference in plots 45 in FIG. 9. Unclassified HEMP standards characterize the E1 phase of the EMP by idealized Difference of double exponentials (DEXP) and quotient exponential (QEXP) waveforms, as shown in FIG. 9, plot 45, left. The EMP E1 model waveforms are given in time-domain (left) and their respective spectral content (right). The evolution of the E1 HEMP standards is presented in table 35 in FIG. 7. The a and f are the exponential constants and k is a normalizing constant for the peak amplitude at the cross section of the two exponentials. In addition to the DEXP and QEXP, two other analytical forms have been developed and presented in the literature: the P-index exponential (PEXP) and the Complimentary error function (ERFC). The main reason for these additional analytic models is some of the deficiencies of the first two models. For example, the DEXP model is discontinuous at t=0, while QEXP extends to t=∞ and has an infinite number of poles in frequency domain.

The method and devices are based on specifications listed in the Military and Civilian Standards and are developed accordingly for accurate description of E1, E2, and E3 pulse components of a HEMP. The standards are used to design and build test facilities to study the impact of HEMP effects and to design, implement, and evaluate the level of protection of devices built for mitigation of the effects. As noted herein, there are software tools to generate and analyze the waveforms described in all publicly available standards. Theoretical and experimental exercises were conducted to investigate waveforms with parameters exceeding the current standards considering worst case scenarios.

The HEMP standards are derived by considering many possible waveforms in time and frequency domains. Mathematical models are created that best express the temporal and the spectral characteristics. The detection of HEMP E1 is the most challenging, requiring ability to monitor the sensors' signals with sub-nanosecond resolution (10s of picoseconds). The two models for the E1 HEMP given in plots 45 in FIG. 9 in time and frequency domains. The DEXP and QEXP models have their advantages (simple analytical forms) and disadvantages: the double exponential model is discontinuous at t=0, while quotient exponential has the advantage of a continuous time derivatives for all orders but also the disadvantage of in that it extends to t=∞ and has an infinite number of poles in the frequency domain.

The model waveforms are useful for testing, but they do not present with high fidelity the complexity of the real HEMP E-field waveforms.

The most critical aspects regarding the HEMP are its propagation speed, broad bandwidth, and high energy. Protection against the hazardous effects of HEMP E1 phase must be achieved in real time with fast response (2.5 ns rise time). It is followed by the E2 and E3 components of the HEMP. In this regard, an accurate detection of E1 can be used to activate robust isolation protection from the consecutive E2 and E3 phases. The E2 component of the pulse has many similarities to an electromagnetic pulse produced by lightning, although the electromagnetic pulse intensity induced by a very close-proximity lightning strike may be considerably larger than the magnitude of the E2 component of a nuclear HEMP (plot 46 in FIG. 9).

Because of the similarities to lightning-caused electromagnetic pulses and the widespread availability of lightning protection technology, the E2 pulse is generally considered to be the easiest to protect against. However, because an EMP produced by a nuclear weapon comprises a complex multi-pulse (i.e., the E1, E2, and E3 components), the primary potential problem with the E2 component is the fact that it immediately follows an E1 component which likely has damaged any devices that were intended to protect against a lightning strike type surges and that could have potentially protected against an E2 component pulse alone. As noted in the United States EMP Commission's Executive Report of 2004, referring to the E2 component pulse, "[I]n general, it would not be an issue for critical infrastructure systems since they have existing protective measures for defense against occasional lightning strikes. The most significant risk is synergistic, because the E2 component follows a small fraction of a second after the first component's insult, which could impair or destroy many protective and control features. The energy associated with the second component thus may be allowed to pass into and damage systems."

The E3 component of the complex multi-pulse is a pulse with a very long rise and fall times, long period of oscillations, and lasts tens to hundreds of seconds (plots 47 in FIG. 9). It is caused by the nuclear detonation heaving the Earth's magnetic field out of the way, followed by the restoration of the magnetic field to its natural state. The E3 component has similarities to a geomagnetic storm caused by a very severe solar corona mass ejection (CME), or stellar-induced EMP's from stellar gamma ray burst sources, supernova, hypernova and collisions of neutron stars. Like a geomagnetic storm, an E3 pulse can produce geomagnetically induced currents in long electrical conductors, which can then damage or destroy components such as high voltage power line transformers. The E3 induced currents are often called quasi-DC currents because by their time domain properties they resemble extremely low frequency waveforms (ultra-long wavelengths) inducing DC-like currents into the long power transmission lines. Nearly all major damage from HEMP E3 in modern infrastructure will occur to systems and substations of the electrical power grid, which is generally not designed to handle direct currents. The vulnerability is especially high for critical devices such as high voltage power transformers.

Figure 10:
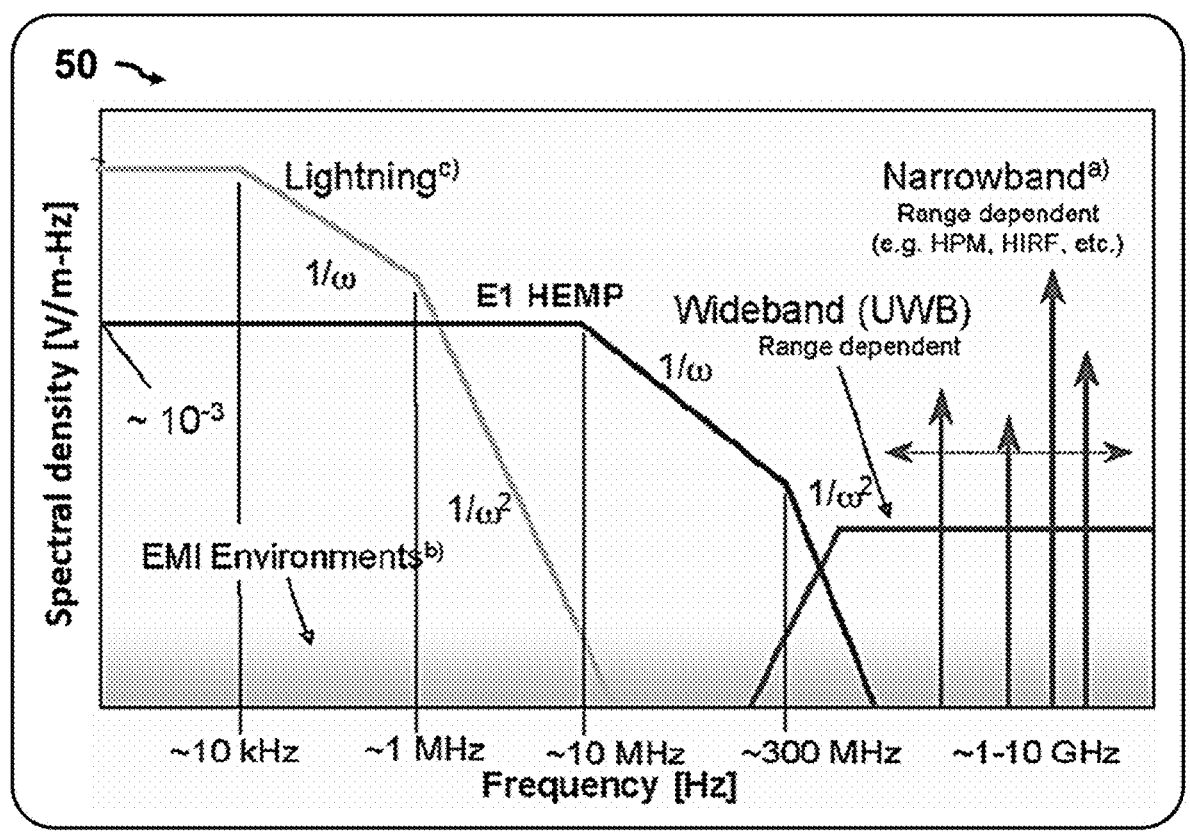
FIG. 10 illustrate the power spectrum density (V/m-Hz) associated with HEMP E1, atmospheric lightning, and IEMI (high-power microwave, high-intensity RF) according to an example of the instant disclosure.

Looking to FIG. 10, the HEMP E1 has a broader spectral content than E2. While the HEMP E2 has similarity with lightning generated EM waves, in proximity, the intensity of the field from lightning exceeds the E2 field strength. The intentional electromagnetic interference may have narrow or wideband spectrum and very different intensity levels dependent on the generating source.

Figure 11:
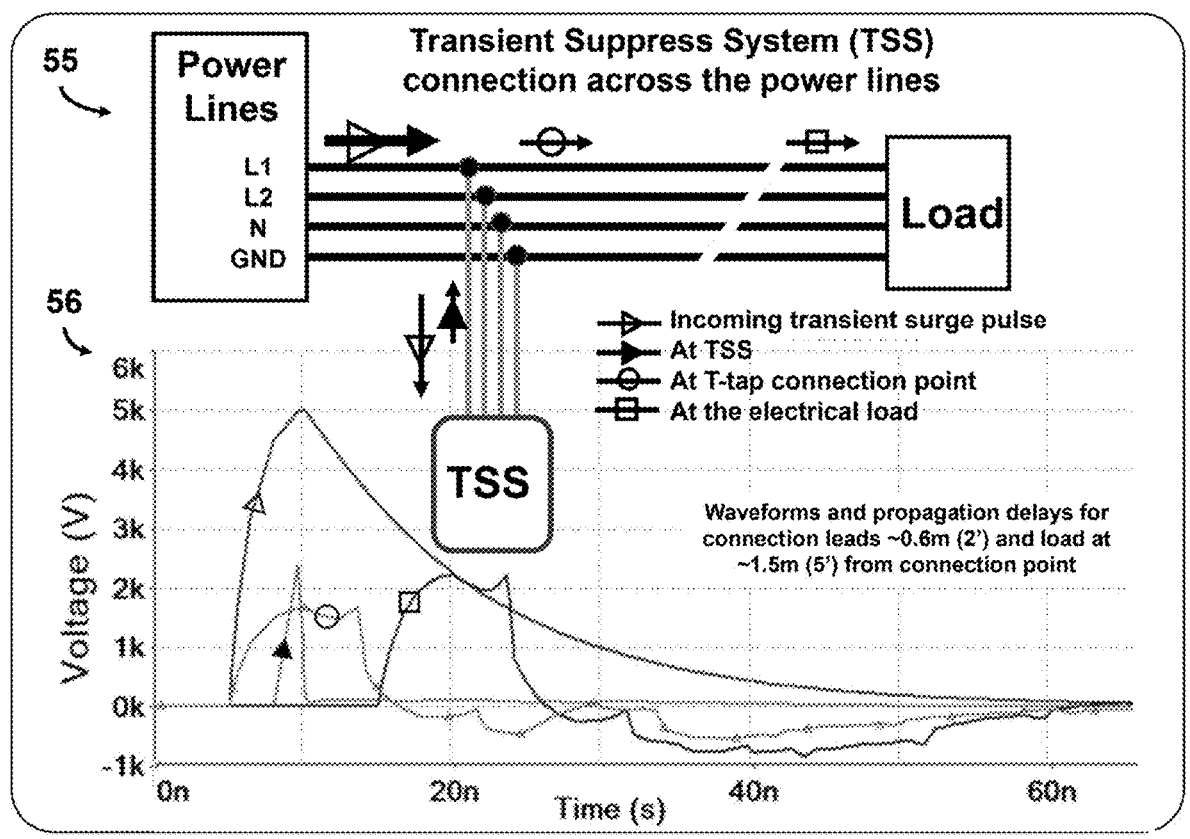
FIG. 11 displays a generalized view of surge protection installation across a split-phase AC power lines and the simulated waveforms at different points of the power lines according to an example of the instant disclosure.

Looking to FIG. 11, a generalized diagram 55 of transient surge protection installation across the power lines of a split-phase 120 VAC power line is displayed. The simulated waveforms at different points of the power lines from the source to the electrical load are displayed in superimposed plots 56 in FIG. 11. The incoming surge pulse on the lines, the modified wave at a transient surge suppressor (TSS), the superimposed waves at the point of connection, and the waveform reaching the load are presented for two different lengths of TSS connecting lead wires. A wave propagation delay depends on its frequency content and the characteristic parameters of the transmission line. The presented simulation results with plots 56 are for a T-tap installation across the lines with 0.6 m (~2') connection leads at location 1.5 m (~5') in front of the electrical load. The propagation speed (and respectively the delay) depends on the frequency. Reflections from TSS also have a negative magnitude content due to the changed (mismatched) load impedance after the triggered response of the surge suppression components. It is important to be noted that the incoming surge pulse propagates further down the power line towards the electrical load during the elapsed time propagation delay from the point of connection to the TSS and back to the power lines.

It is important to note that when the wavelength of a signal becomes comparable and shorter than the length of the transmission line, the transmission line wave propagation must be considered. The wavelength of 60 Hz is approximately $5 \cdot 10^6$ m. The wavelength of 300 MHz is approximately 1 m. The electromagnetic wave propagates in the media between the conductors forming the transmission line and depends on the transmission line configuration (conductors' size, cross-section, and distance) and material properties. The speed factor is used to characterize the speed of propagation in each medium (coaxial cable, twisted pair, microstrip, etc.) in comparison to the speed of light in vacuum. More details can be found in the literature, and it is beyond the scope of this application. It is sufficient to emphasize that the speed factor can be in the range from 0.4 to 0.85 for low quality and a high-quality cable, respectively. The propagation speed (m/s) and respectively the delay (s), phase constant (rad/m), skin depth (m) and attenuation (dB/m) are frequency dependent and propagation medium dependent. Published data for measurements of propagation delay also shows a dependance on temperature. Literature data shows a $1.735 \cdot 10^8$ m/s propagation speed at 25° C. and $1.765 \cdot 10^8$ m/s at 45° C. That indicates an example propagation delay of 1 ns for 0.17 m (~6.7") transmission line length in this case. For a T-tap across the line connection the propagation delay from the point of connection is proportional to the length of the connecting wires. The suppressed reflected wave reaches back the T-tap connection point after a roundtrip to the TSS and back. The legend in the figure indicates the waveforms at different points on the line and the respective waveforms on the plots. A precise wave propagation and reflection depends on multiple factors associated with the transmission line and characteristics of the TSS's surge protection components. The main point is to illustrate that the incoming transient surge wave propagates towards the electrical load and reaches the load before the TSS starts to react to the transient surge wave.

Figure 12:
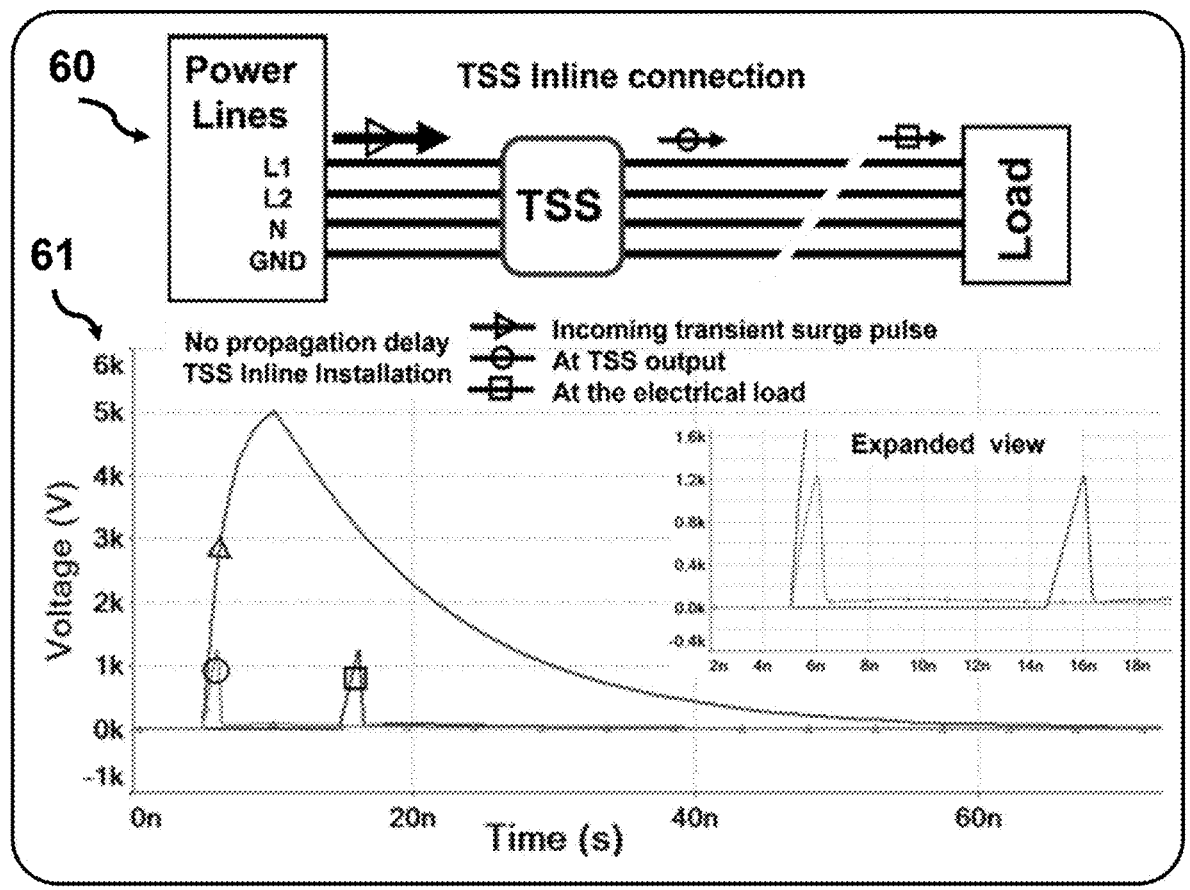
FIG. 12 displays an inline installation of a transient surge suppression system (TSS) and the simulated waveforms at different points of the power lines according to an example of the instant disclosure.

Looking to FIG. 12, a generalized diagram 60 of inline transient surge protection installation is displayed. The simulated waveforms at different points of the power lines from the source to the electrical load are displayed with superimposed plots 61. The incoming surge pulse on the lines, the modified wave at the output of the inline transient surge suppressor (TSS), and the waveform reaching the load are presented. The legend in the figure indicates how the waveforms at different points on the line are marked and respectively the waveforms on the plots. There is no propagation delay from connection point (in this case the inline insertion point) to the TSS and, respectively, there is no reflected waveform superimposed on the wave propagating towards the load. A precise wave propagation and reflection depends on multiple factors associated with the transmission line and characteristics of the TSS's surge protection components. The main point is to illustrate that the TSS reacts immediately to the transient surge wave, limits, absorbs, and shunts (redirects) most of the energy, and only the suppressed waveform propagates towards the electrical load.

Figure 13:
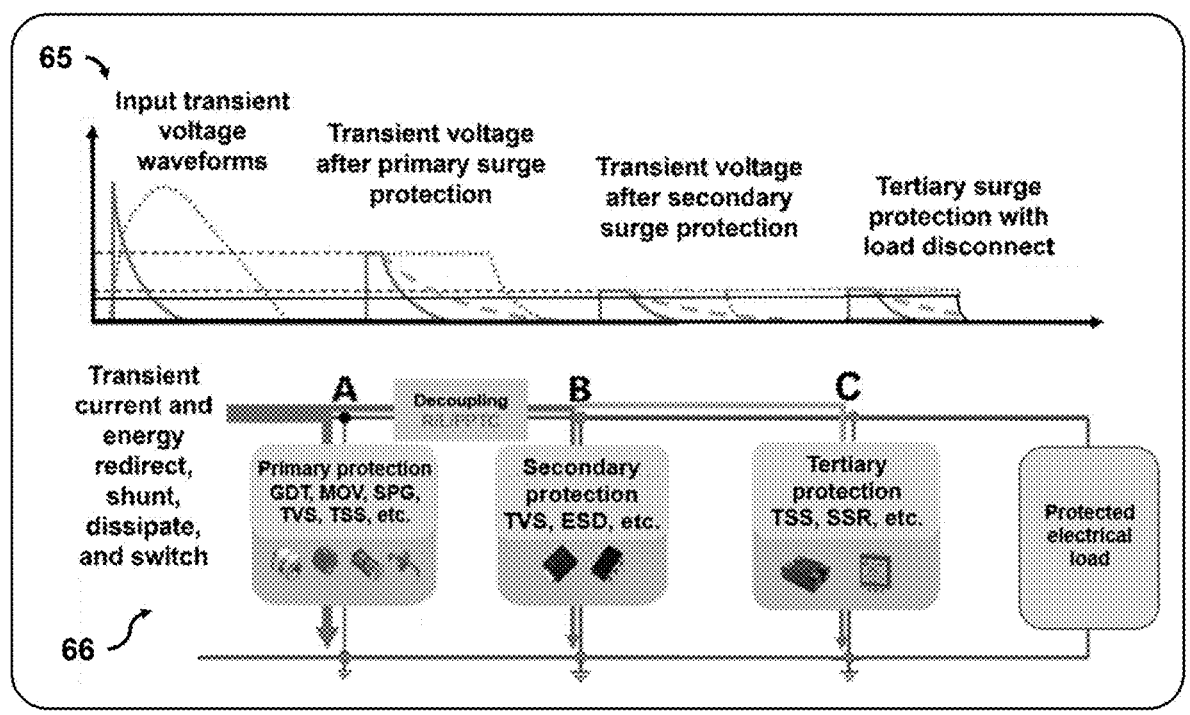
FIG. 13 presents a notional diagram of a hybrid TSS with primary, secondary, and tertiary protection subsets with some examples of the multiple components available to the designer of a TSS to address the specific needs and requirements according to an example of the instant disclosure.

Looking to FIG. 13, the notional diagram 66 of a hybrid transient suppression system (HTSS) is presented with allocated primary, secondary, and tertiary surge suppressing assemblies. An example of transient voltages magnitude in time is illustrated with plot 65. It is shown that the voltage threshold of the primary protection A is above the triggering threshold level of the secondary protection B. A tertiary protection C is notionally illustrated with a soft power disconnect when a predetermined prolonged duration of overvoltage and respectively overcurrent is detected. The HTSS notional diagram 66 lists some of many components available to the designer of a TSS to address the specific needs and requirements for a particular application. The complete list of components is beyond the scope of this application. Most used include transient voltage suppressors (TVSs), metal oxide varistors (MOVs), gas discharge tubes (GDTs), polymeric positive temperature coefficient thermistors (PPTCs), negative temperature coefficient thermistors (NTCs), thyristor surge suppressors (TSS), solid state relay (SSR), other solid state and nonlinear components based on semiconductors (i.e., Si, Ge), compound semiconductors (i.e., SiC, GaN, GaAs) and metamaterials, mechanical, electrical and ionization discharge devices (IDDs), and combinations thereof.

Figure 14:
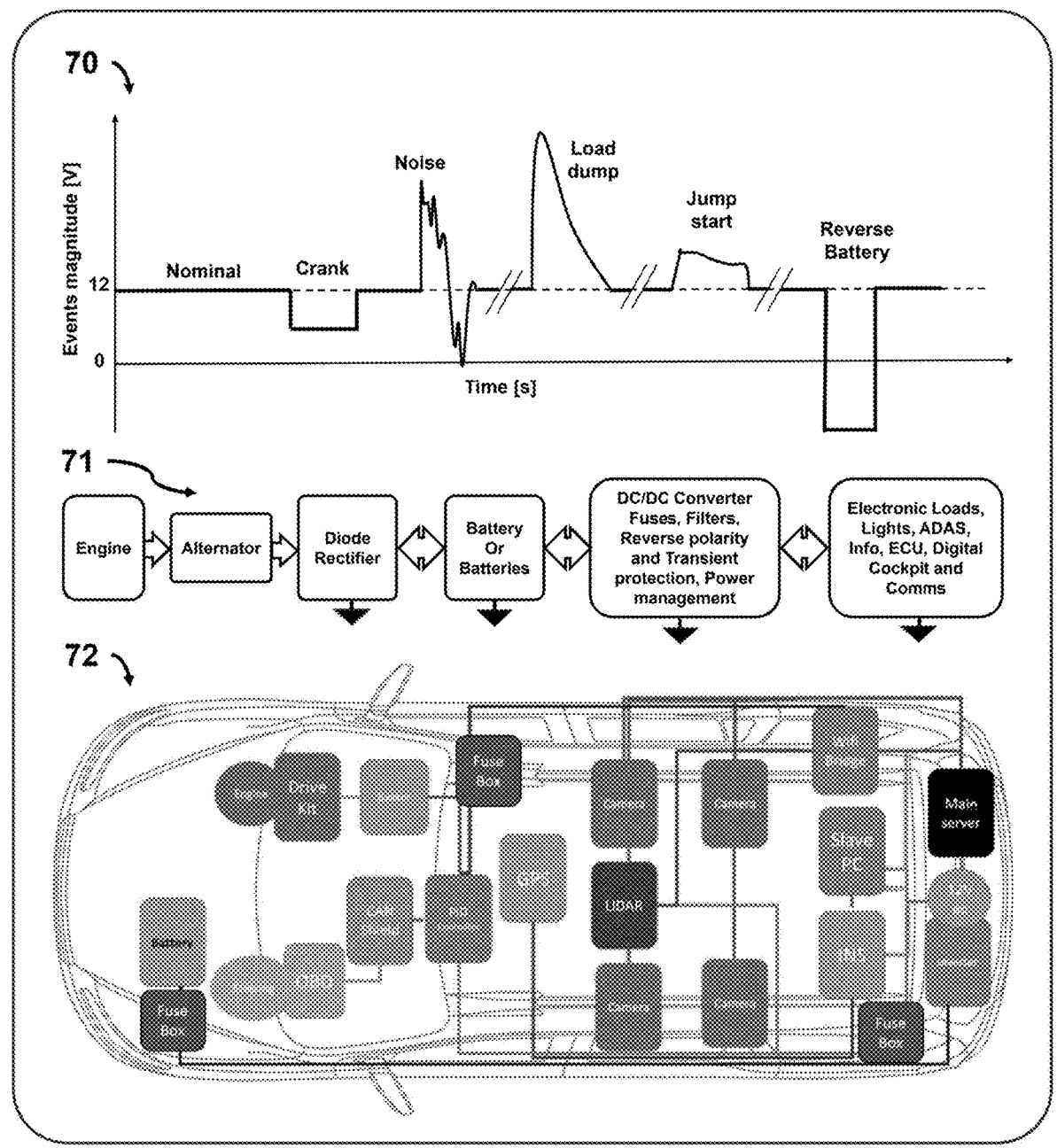
FIG. 14 presents the type and magnitude of the most frequent voltage surge events associated with operation of a vehicle (top) and a very high-level block diagram of a vehicle main subsystems for power source, regeneration and distribution is presented in the (middle). A notional top view of the multiple electrical and electronic system and subsystem of a modern vehicle is presented on the bottom of the figure according to an example of the instant disclosure.

Looking to FIG. 14, a combined summary plot 70 is given for the type and magnitude of most frequent voltage surge events associated with operation of a vehicle: crank, noise, load dump, vehicle jump start, incidental battery polarity reverse. These possible events and the possible voltage and current surges must be considered in addition to external EMI and intentional EMI. For example, the negative polarity due to battery reverse and operational noise. In the middle of FIG. 14, a very high-level block diagram 71 is presented of vehicle main subsystems for power source, regeneration, and distribution. On the bottom of FIG. 14, an example top view diagram 72 of the multiple electrical and electronic system and subsystem of a modern vehicle is presented on the bottom. As illustrated, with the multiple vehicle subsystems, there are multiple fuse boxes distributed on the different electrical and electronic subsystems. Without loss of generality, similar considerations apply to hybrid vehicles and could be extended to electric vehicles (EVs) with different power sources (battery, fuel cell, etc.). In general, the plurality of sensors, on board communications and data processing, and extended power management in EVs complicates further and make the subsystems more vulnerable and susceptible to EMI.

Figure 15:
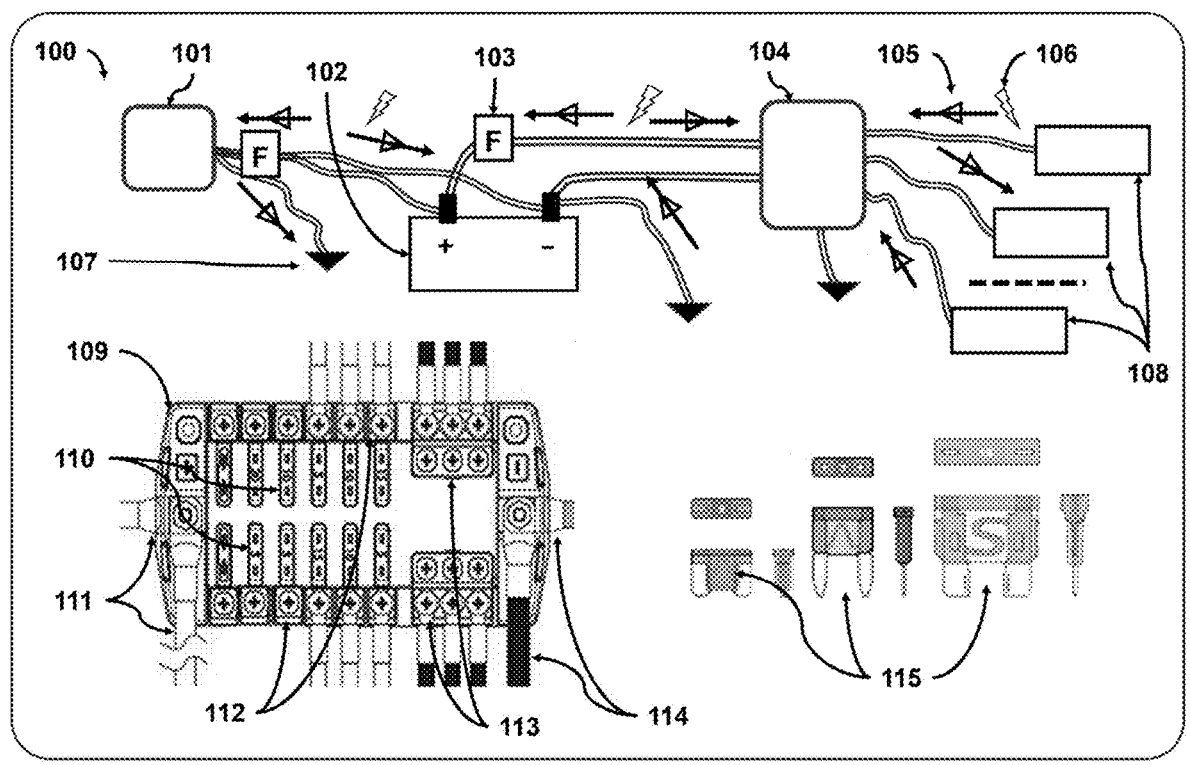
FIG. 15 presents a block diagram of a typical installation of a TSS on a vehicle (top), a view of a commercially available vehicle fuse box and blade fuses with different size and current capacities (bottom) according to an example of the instant disclosure.

Looking to FIG. 15, the block diagram 100 of typical installation of a TSS 101 on a vehicle is presented. The electric source is the vehicle battery 102, usually 12 VDC but 24 VDC and higher becoming used with more complex battery management system. The neutral tab of the battery is connected to vehicle chassis 107 and provides the negative side (ground) for all electrical and electronic loads. In general, the power distribution has a main fuse 103, or a circuit breaker, and every load (or group of similar loads) has a properly sized fuse located in a fuse box 104. As shown in FIG. 15, every wire is susceptible to external EMI radiation 105 and conductive 106 transients. Also shown in FIG. 15 is the TSS installation in combination with a fuse F, as required by the standard indicated. Without loss of generality, the block diagram in FIG. 15 may represent the common installation of TSS in passenger cars, tracks, utility vehicles, and small size marine vessels.

On the bottom left of FIG. 15, the top view of a vehicle fuse box 109 is shown with the typical sockets for blade fuses 110. The fuse box 109 has a positive terminal 111 connected to the positive pole of the vehicle battery and a negative terminal 114 connected to the negative pole of the battery. The output terminals of the fuse sockets 112 connect to the positive pole of the electric loads. The return connectors from the negative side of the loads connect to terminals 113 which are connected to the negative terminal 114 and respectively the battery negative terminal and the vehicles' chassis. Many commercially available blade fuses 115 have different current capacities and multiple standardized sizes, as shown on the bottom right of FIG. 15.

Figure 16:
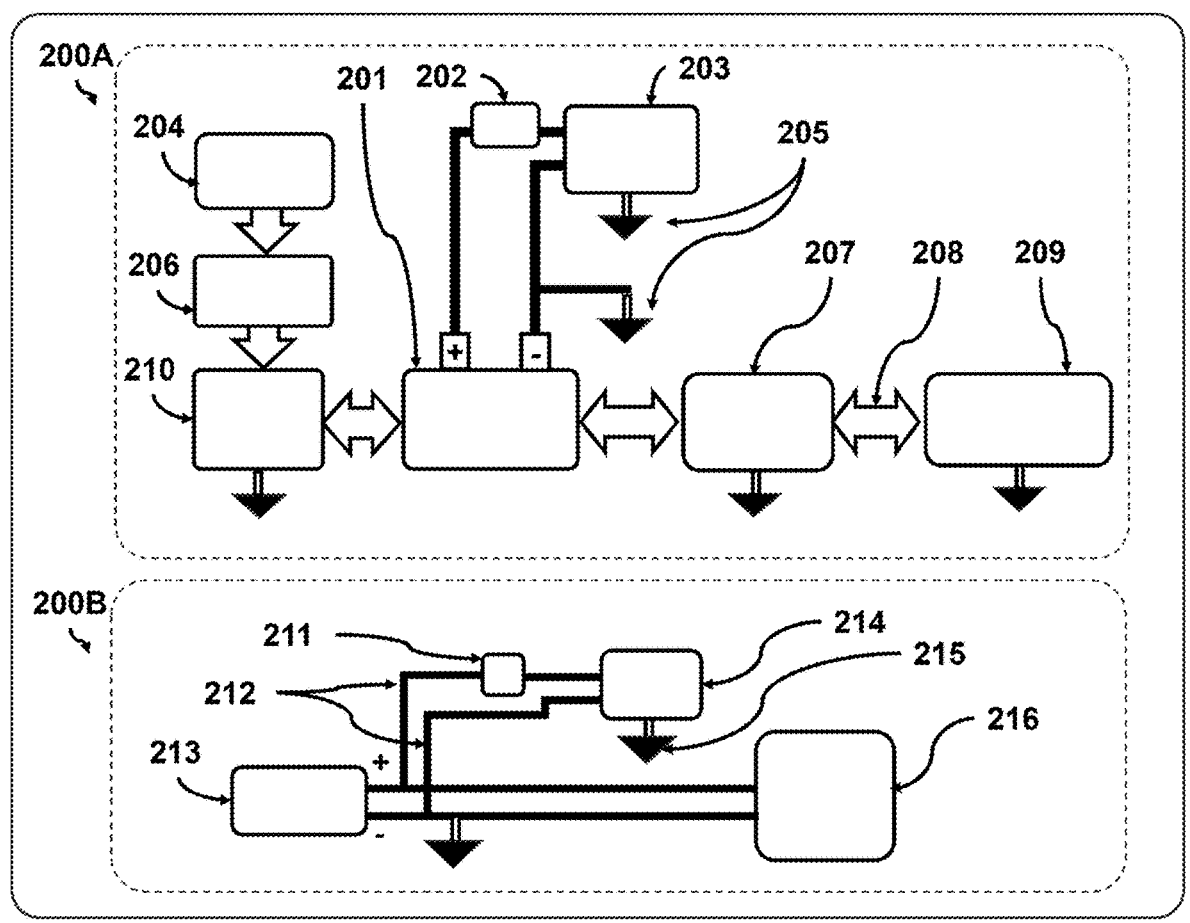
FIG. 16 displays two block diagrams that illustrate current design and installation practice of TSS on vehicles in proximity to the vehicle's battery using across-the-lines configuration installation according to an example of the instant disclosure.

Looking to FIG. 16, two block diagrams 200A and 210B are presented with subsystems annotation. The diagrams illustrate the current manufacturers' design approach for installation of TSS on vehicles. Namely, a transient suppression device (TSD) 203 with a plurality of transient voltage suppression components is connected to the positive and negative tabs of the vehicle battery 201 and a third connection lead is connected to the chassis 205. As required by the standards, a fuse 202 is used. Some of the main components of the vehicle systems are shown to illustrate the interconnected subsystems. The local, on the battery installation, is intended to provide overall protection for the vehicle. The block diagram includes the engine 204, the alternator 206, the diode rectifier 210, multiple DC-DC converters, filters, fuses, power management subsystem annotated with 207, and the plurality of electrical and electronic loads 209 which include lights, Advanced Driver Assistance Systems (ADAS), electronic control unit (ECU), digital cockpit utilities, infotainment, and other network subsystems interconnected with power and signal distribution busses 208.

Block diagram 200B illustrates an example installation of a current commercially available vehicle SPD. The SPD is design and implemented for a T-tab installation across the power lines of a vehicle. TSS 214 is connected to the positive and negative lugs of battery 213 using wire leads 212. An inline fuse 211 is usually used. A third wire lead of TSS 214 is connected to the vehicle chassis 215. The battery 213 provides power to plurality of electrical and electronic loads 217 with power distribution network 216.

The shortcomings and limitations of across-the-line TSS installation were discussed previously in this application. Many commercial TSD for vehicles have connection leads with length of 3-4 feet and even longer to provide convenience for installation. The deficiencies of such implementations were given previously and are briefly listed here again. First, the long leads 212 impose a delay of the TSS 214 response to induces and conductive transients on power distribution network 216. Second, the long leads 212 act as points of radiation susceptibility (antennae). Third, the fuse 211 must be sized appropriately with a capacity required for the whole power distribution system. Usually, this has constraints and limitations, and TSDs with 50A, 35A, and even lower values are commercially available. This obviously contradicts the presents of multiple fuses and multiple fuse boxes with combined current limiting capacity exceeding hundreds of Amperes. One of the main reasons for the use of a limited capacity inline fuse (202 and 211) is the utilization of gas discharge tubes (GDTs and GGDTs) as shunt protection components in TSD. The GDTs are small, high capacity, and low cost—all advantageous elements for TSD implementation. However, the intrinsic characteristic of GDTs is that they remain switched on in low impedance state after the transient surge has passed. This necessitates the use of a limited (lower) current capacity inline fuse 202 for TSS 203 and 211 for TSS 214, respectively. The current system eliminates this shortcoming as it is shown below.

Figure 17:
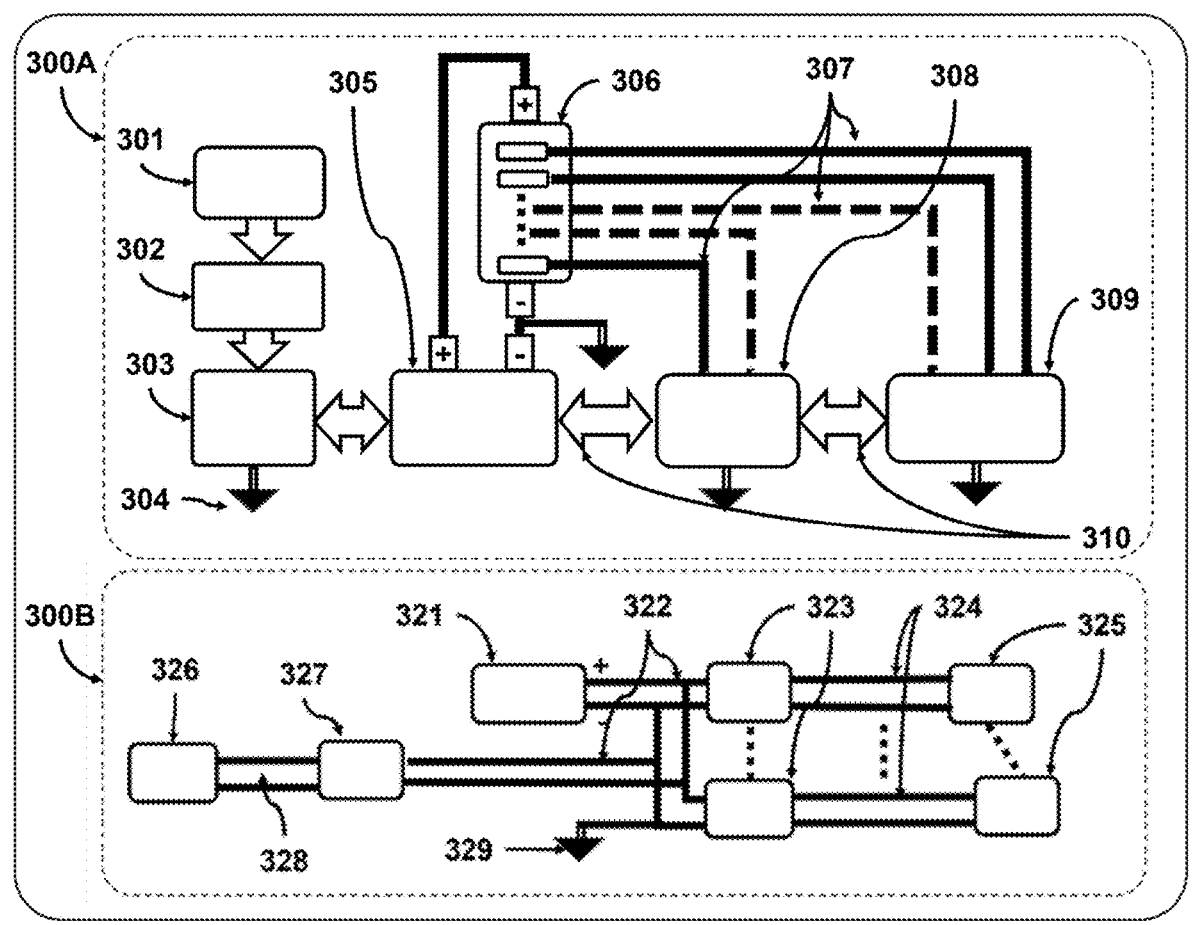
FIG. 17 displays two block diagrams s to illustrate methods and implementations of an inline transient protection embedded with a fuse and used for inline installation to protect a dedicated electrical load according to an example of the instant disclosure.

Looking to FIG. 17, two block diagrams 300A and 300B are presented with subsystems annotation. Some main components of a vehicle systems are shown again to illustrate the interconnection of main subsystems such as the engine 301, the alternator 302, the diode rectifier 303, the battery 305 with its negative pole connected to vehicle chassis 304, the combined block diagram of multiple DC-DC converters, filters, fuses, power management subsystem and the plurality of electrical and electronic loads 311 which include lights, ADAS, ECU, digital cockpit utilities, infotainment, and other network subsystems interconnected with power and signal distribution busses 312. The multiple in-line embedded TSSs 309 are connected to their respective loads 311 with the wire connectors annotated by 207 and 310.

FIG. 17 shows diagrams that illustrate an example method and implementation of transient protection component with a fuse that is used on a dedicated line for a dedicated electrical load. This new design of a transient suppression device (TSD) is connected to a dedicated fuse for a given load and the negative tabs of the vehicle battery (and respectively to chassis). This is an equivalent of an inline installation of TSS with the described advantages as illustrated previously in FIG. 12. Further description and advantages are given below.

In general, the installation of an embedded in-line installation of distributed dedicated TSS is illustrated in more detail using block-diagram 300B in FIG. 17. In comparison to a single point TSS at the battery 321, there are multiple embedded TSSs installed in fuse boxes 323 and 327 located on different branches of the power distribution network 322. The negative pole of the battery 321 and respectively the fuse boxes negative poles are connected to the vehicle chassis 329. The TSSs in the fuse boxes 323 are installed in line and connected to their respective loads 325 using the wires 324. The TSSs in fuse box 327 are connected in-line to their respective loads annotated by 326. The purpose of the diagram is to emphasize the distributed in-line installation of embedded TSSs in proximity to their respective loads. This provides surge protection exactly where it is needed, with a response without delay, and with a fuse capacity properly sized for its load. One may think in terms of comparing a T-tap TSS installation at the battery (101 in FIGS. 15, 203 and 214 in FIG. 16) vs dedicated embedded in-line TSSs (309, 323, and 327 in FIG. 17) distributed near the protected loads. Instead of one large capacity main fuse or circuit breaker 202 and 211 in FIG. 16 multiple, properly sized fuses embedded with a surge protection (309, 323, and 327 in FIG. 17) installed in-line near specific load.

Figure 18:
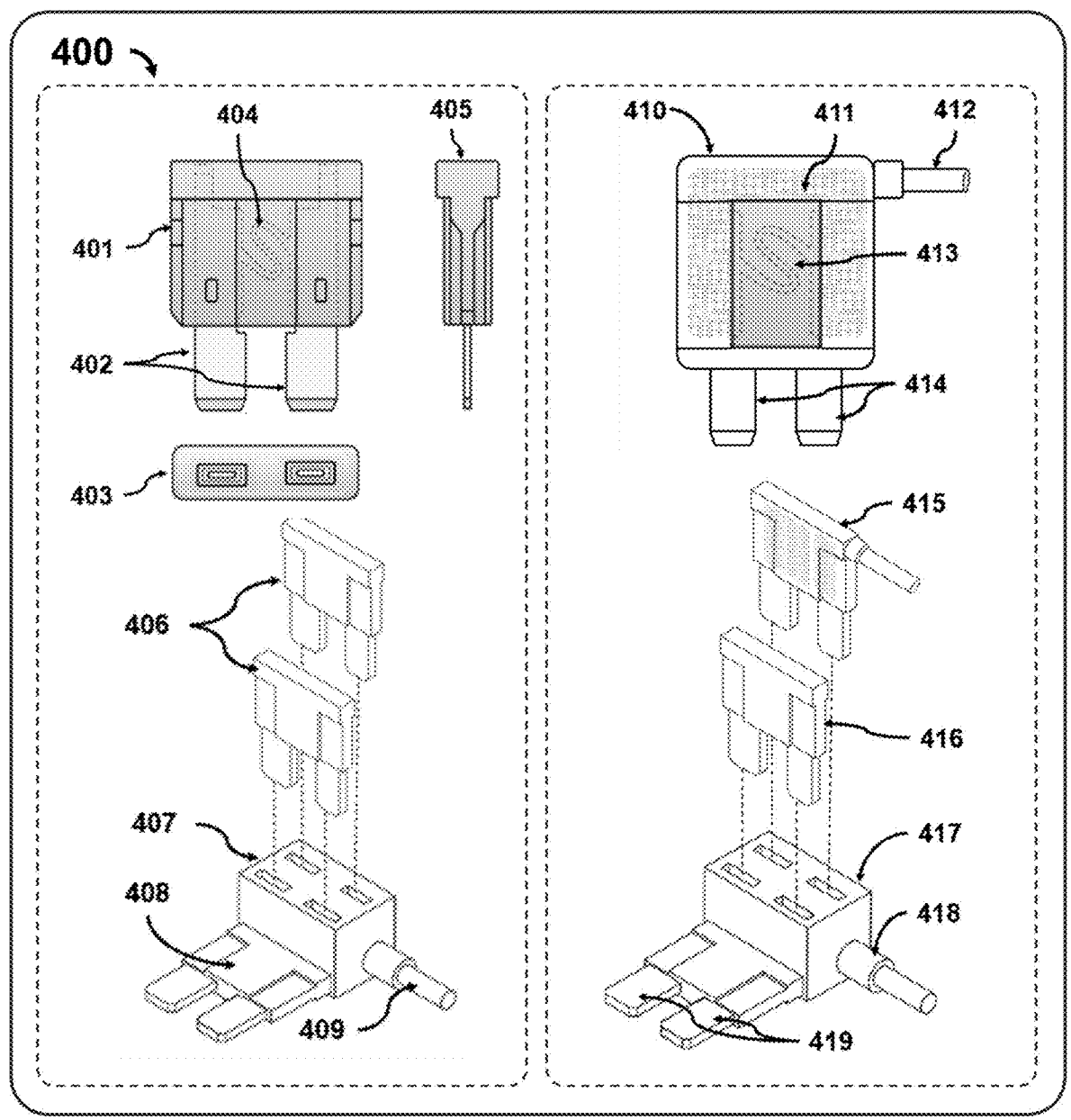
FIG. 18 displays a commercially available fuse expansion tap to add an additional blade fuse for an additional electrical load. Additionally.

Looking to FIG. 18, it sets the background for an implementation of an example method for embedded inline TSS. One common way for adding additional fuse to an existing fuse box is achieved by removing a fuse and plugging a fuse expansion tap (also known as a fuse holder connector extension, car auto fuse tap adapter, blade holder extension, and others) in the socket of the removed fuse. The removed fuse is plugged back in one socket of the expansion tap and an additional fuse is inserted in the second socket. The second socket has a lead wire that connects to the positive pole of the new load for which the additional fuse is used.

In the left top side in FIG. 18, the front 401, bottom 403, and side 405 views of a standard blade fuse with its two blades 402 are shown. A commercially available fuse expansion taps 407 with two blades 408 and lead wire 409 is shown in the bottom left in FIG. 18, illustrating how it is used to install two fuses 406 using only a single fuse socket of the fuse box. In summary, one common way for adding additional fuse to an existing fuse box is achieved by removing a blade fuse and plugging fuse expansion tap with additional sockets in the fuse box socket of the removed fuse.

On the top of the right side in FIG. 18, the front view of an example embodiment of the example two-blade transient suppression device (BTSD) 410 is shown. The BTSD 410 has a form factor analogous to a standard two-lade fuse (401 in FIG. 18, left side). The BTSD 410 has two blades 414 that match dimensions of standard two-blade fuse blade and a lead wire 412. The embedded fuse 413 is internally connected between the two blades 414. Identical to a standard blade fuse 401, one of the blades is connected to the positive power line and the second blade is connected to the positive pole of the load associated with the fuse. The surge protection component 411 of BTSD 410 is internally connected between the fuse side connected to the load and the lead wire 412.

In FIG. 18, in the bottom right side is shown how a removed two-blade fuse 416 is inserted in the first socket of the fuse expansion tap and instead of adding a second fuse, the BTSD 415 is plugged into the second socket of the expansion tap 417 with its two blades 419 and load connecting lead wire 418. With this example embodiment, the direct inline TSS installation utilizes an existing fuse box on a vehicle and the example blade design embodiment of TSS. The lead wire 418 of the fuse expansion tap 417 is connected to the positive pole of the electric load following the standard way of adding a fuse. The lead wire of the BTSD 415 is connected to the negative terminal of the fuse box, providing surge protection between the positive and the negative power lines with surge protection installed in series with a fuse as required by standards. As a final note, the form factor embodiment of the BTSD matches the form factor of the respective two-blade fuses with which it is used: standard, micro, mini-micro, and others.

Figure 19:
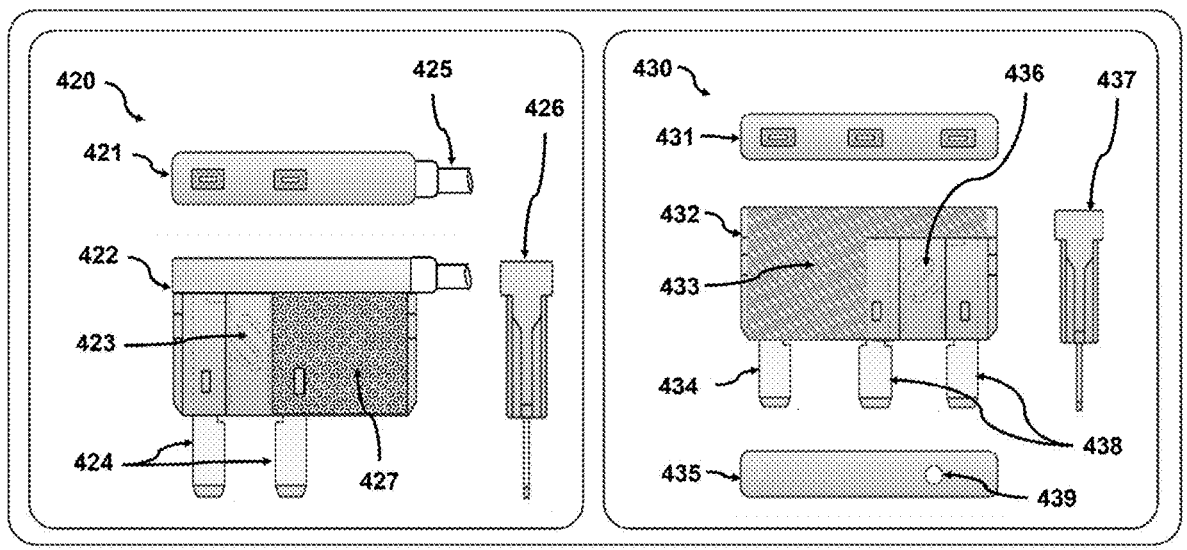
FIG. 19 displays on the left side an example embodiment of two-blade transient suppression device (BTSD) with an embedded fuse and connecting lead wire. On the right side, an example embodiment of a three-blades (3BTSD) is displayed with an embedded fuse and TSS for direct installation in a 3-blade socket to provide a transient voltage protection to a dedicated electrical load according to an example of the instant disclosure.

Looking to FIG. 19, on the left side, a set of three drawings 420 displays the front 422, bottom 421, and side 426 views of an embodiment of an example BTSD. The front view 422 displays the example two-blade transient suppression device (BTSD) with its embedded built-in fuse 423. This example design BTSD embodiment comprises embedded fuse 423 in series with embedded TSS 427. A two-blade implementation can be used to directly replace a two-blade fuse in a fuse box socket comprising an inline embedded BSPD. The embedded TSS 427 is internally connected to embedded fuse 423 side that is respectively connected to the positive pole of the electrical load. The output end of the embedded TSS 427 is connected to the negative terminal of the fuse box with lead wire 425.

On the right side in FIG. 19, a set of three drawings 430 displays one more example embodiment of an embedded fuse with TSS for inline installation. The front 432, bottom 431, top 435, and side 437 views are shown. This embodiment adds a third blade 434, forming a three-blade TSD (3BTSD) and eliminates the need of connecting lead wire to the negative terminal of the fuse box. LED indicator 439 provides status indication. The embedded TSS 433 in this example embodiment is connected between the end blade 438 and the added third blade 434. The central blade 438 connects to positive power line supply. The internal in series connection of embedded fuse 436 and embedded TSS 433 connects to the positive pole of electrical load. The added third blade 434 connects to negative power supply line. The 3BTSD embodiment provides performance advantages which will be discussed later in this application. Obviously, this 3-blade embodiment requires a 3-blade socket for its installation. The embedded fuses 423 and 436 and TSSs 427 and 433 in example embodiments shown in FIG. 19, are sized appropriately for voltage surge protection and overcurrent capacity.

Figure 20:
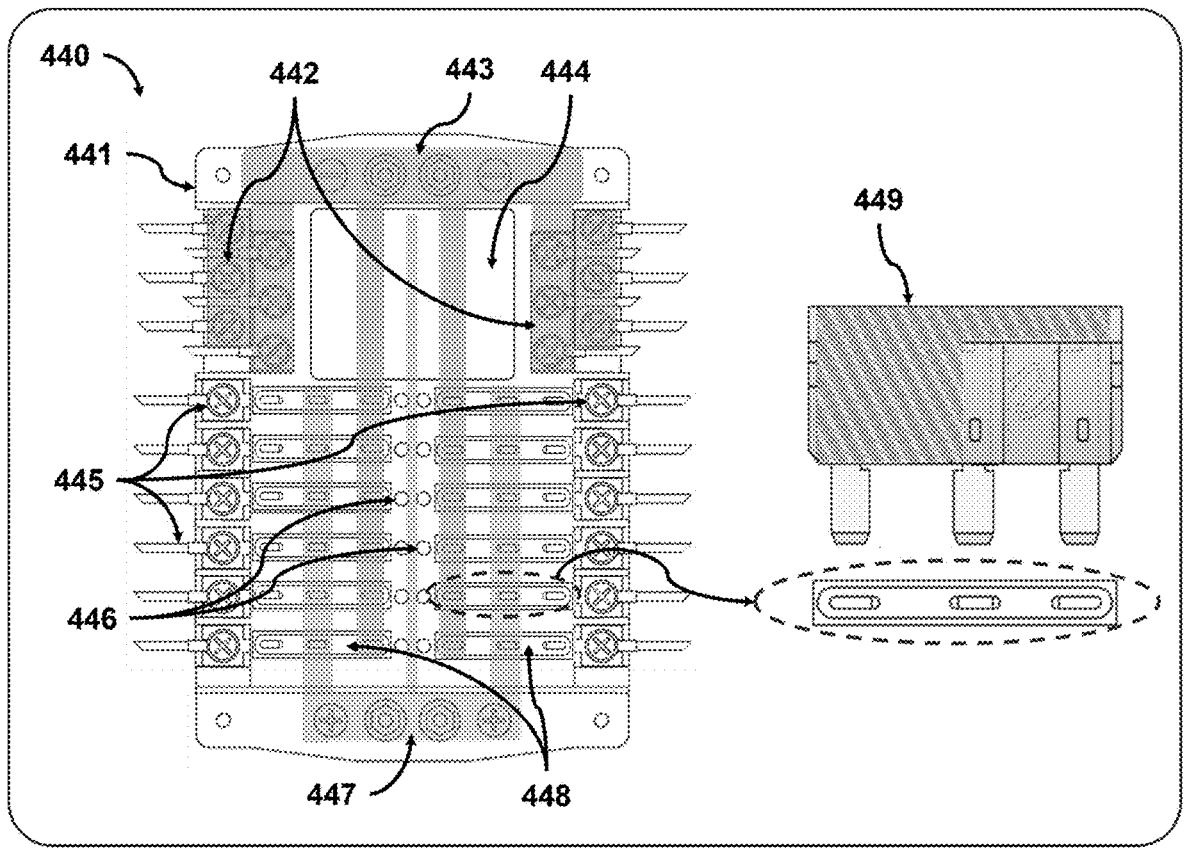
FIG. 20 displays the top view of a fuse box with 3-blade sockets for use with an example 3-blade, embedded BTSD. The fuse box electrical power busses that connect to battery positive and battery negative poles are shown with the terminal connections to positive and negative poles of electric loads according to an example of the instant disclosure.
Figure 21:
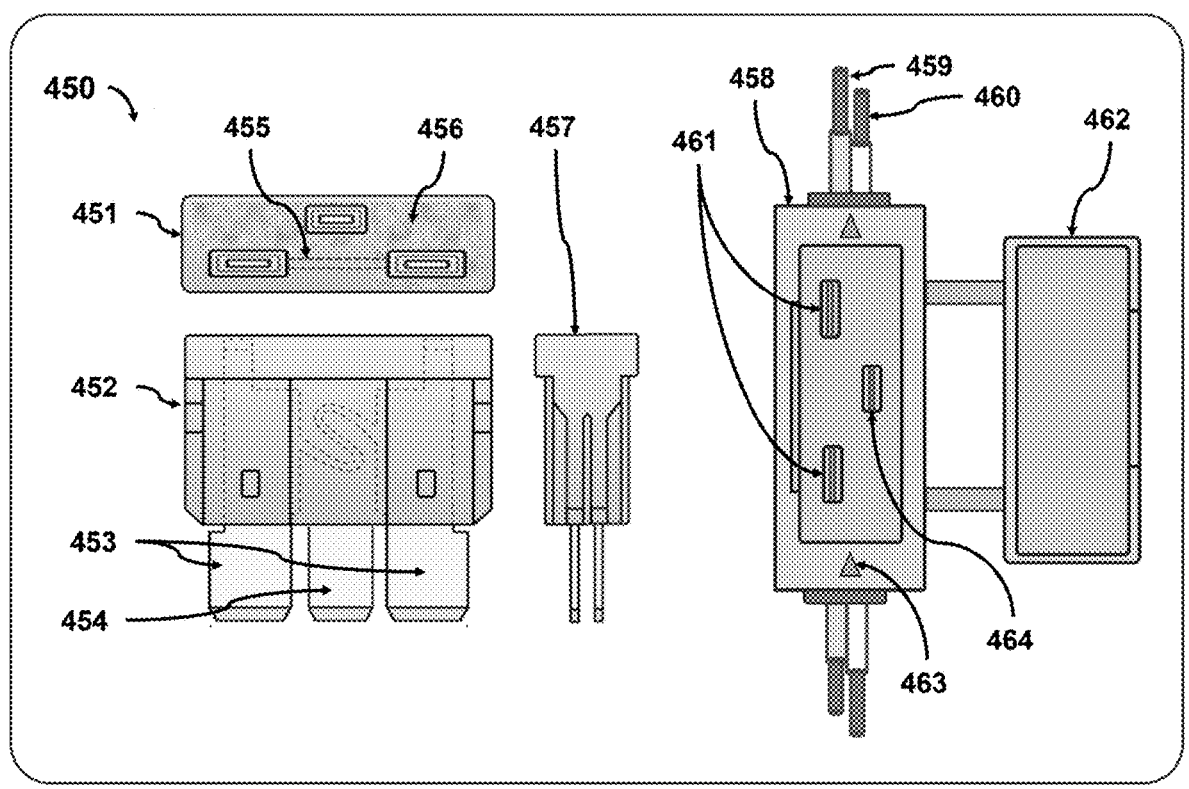
FIG. 21 displays on the left side, the front, bottom, and side views of an example embodiment of a 3-blade BTSD with a third blade off-axis of the two fuse blades and connecting an embedded TSS. An example utilization of this compact implementation of a 3'BTSD is illustrated on the right side of FIG. 21 with an inline installation using a 3-blade fuse holder. The inline fuse holder has a 3-blade socket for insertion of a matching 3'BTSD according to an example of the instant disclosure.

Looking to FIG. 20, a combined display 440 presents the top view 441 of a fuse box with 3-blade sockets 448 for use with an example embedded 3-blade BTSD (3BTSD) 449, shown on the right. As can be seen in FIG. 21, 3-blade sockets fuse box 441 has internal conductive busses 447 and 443 for connection to battery positive and battery negative poles, respectively. Fuse box 441 has terminal connections 445 and 442 to the respectively positive and negative poles of electric loads. In comparison to a standard, 2-blade sockets fuse boxes (an example shown in FIG. 15), this embodiment example of 3-blade fuse box 441 has two internal power buses that connect the third blade of a socket-inserted 3BTSDs to the negative terminal 443 of the fuse box 441 and respectively the negative pole of an electric load. The embedded 3BTSD is connected to the output side of the embedded fuse of 3BTSD and respectively to the positive terminals 445 of the fuse box 441. Terminals 445 are associated with a 3BTSD and respectively a dedicated electric load.

On the right side of FIG. 20, the front view of the 3-blade BTSD 449 (3BTSD) is shown aligned with one 3-blade socket. This illustrates the easy installation of the example 3BTSD and the easy replacement, when necessary and indicated by a status LED changed color. In this regard, the status indicator on the top of the 3BTSD is a useful functional characteristic and practical utility.

Looking to FIG. 21, a set of four drawings 450 displays on the left side, the front 452, bottom 451, and side 457 views of an example embodiment of a 3-blade BTSD with a different blades' configuration. The third blade 454 for connection to the negative pole of the power is located off the axis of the two fuse blades 453. This off-axis arrangement is different in comparison with the 3-blade example embodiment shown in FIG. 19. Having all three blades on the same axis. As can be seen in the front view 452 in FIG. 21, the example embodiment 451 provides more compact implementation of a 3BTSD, and it is applicable to inline installation like current two-blade fuses. For clarity of notations, this example embodiment is referred to as 3'-blades 3'BTSD (referring to two on axis+one off axis blades).

On the right side in FIG. 21 is shown the top view of an open inline 3'BTSD holder 458 with its cover cap 462, and its blade sockets 461 and 464. After insertion of a 3'BTSD, the embedded fuse, connected between the two inline blade sockets 461, makes in series connection from a power source towards a load on a positive power line 459. A TSSA is connected after the fuse (the load end of the fuse) to the third blade socket 464, which respectively is connected to the negative power supply line 460. In this regard, an inline installation of a 3'BTSD with an embedded fuse is directional: an input from the power source and an output towards the load as indicated with the triangle marks on the 3-blade fuse holder It is important to note that with the off-axis position of the third blade provides a guaranteed correct insertion of the embedded 3'BTSD.

Figure 22:
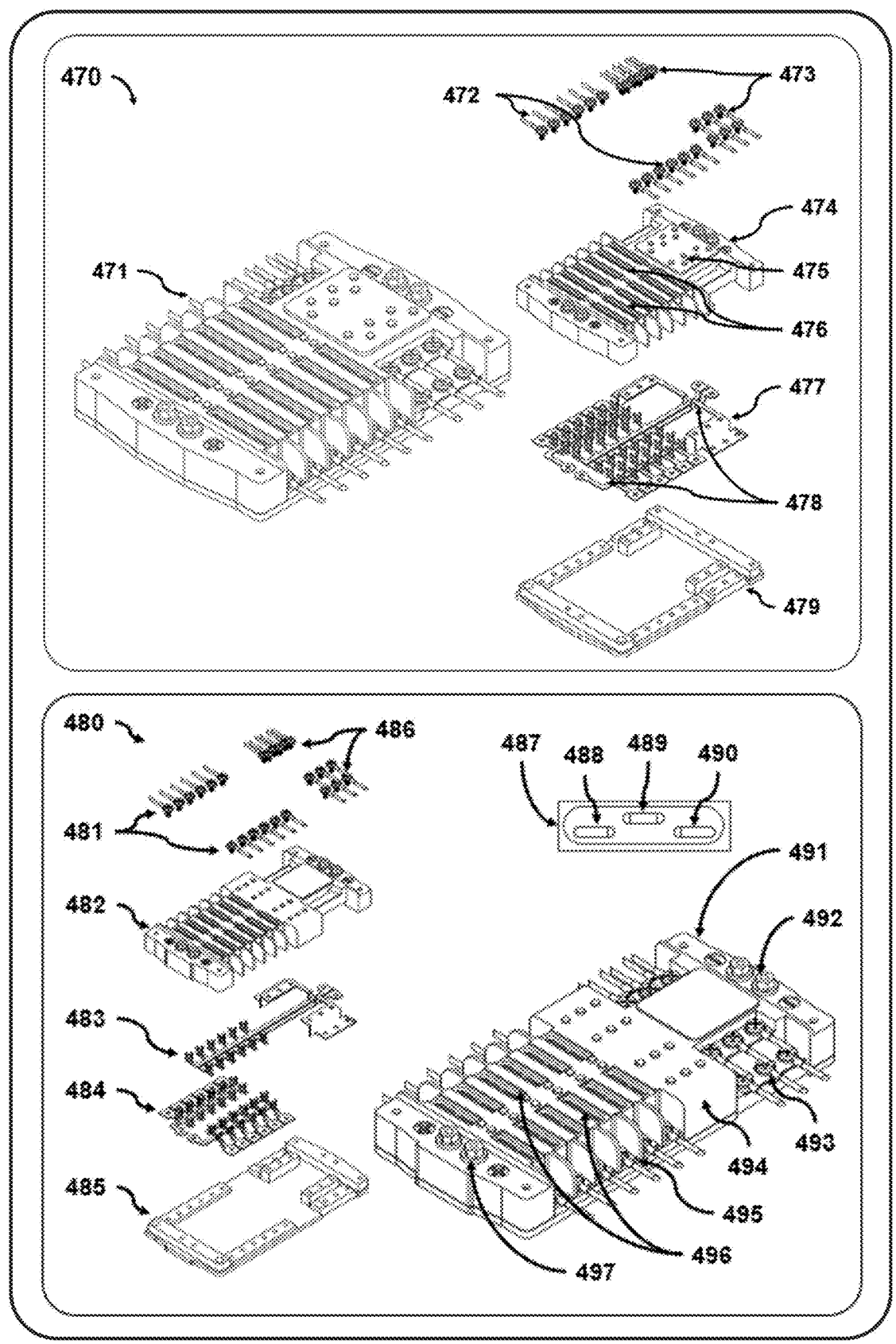
FIG. 22 presents on the top the 3D model view of one example embodiment of fuse box with single axis 3-blade sockets and internal assembly subcomponents foe use with single axis 3BTSD. The annotated assembly subcomponents are shown on the right according to an example of the instant disclosure. In the bottom right side of FIG. 22, the 3D model view of one example embodiment of fuse box with 3-blade sockets is displayed for use with 3'BTSD with an off-axis third blade. The annotated assembly subcomponents are shown on the left according to an example of the instant disclosure.

Looking to FIG. 22, a 3D model view 470 of one example embodiment of a fuse box 471 with 3-blade sockets is displayed. On the right side, the annotated assembly subcomponents are shown to illustrate further the integral fuse box components. Terminal connectors 472 provide power connections to the positive poles of electrical loads. Terminal connectors 473 are the negative poles load connectors. The upper part 474 of fuse box 471 has a plurality of three-blades sockets 476 and additional circuit and display components 475. One of internal power buses 478 provide power to one end blade socket from a connection to positive battery pole and the second bus provides connections to each socket of the embedded TSS to the negative pole of the battery. Base 479 of fuse box 471 forms an enclosure when assembled with cover 474 to provide housing for the fuse sockets 476, power buses 478, and additional circuit components 475.

Looking to FIG. 22, a 3D model view 480 of one example embodiment of a fuse box 491 with a plurality of three-blades sockets 496 is displayed. On the left side of view 480, annotated assembly subcomponents are shown. Terminal connectors 481 provide power to the positive poles of electrical loads. Terminal connectors 486 are the negative poles load connectors. The upper part 482 of fuse box 491 has a plurality of three-blades sockets and accommodates additional circuit and display components. In The internal power buses 484 provide power to one side of each fuse socket from a connection to positive battery pole connector 497. The buses 483 provide connections of each socket of the embedded TSS to the negative pole of the battery connector 492. Base 485 of fuse box 491 is assembled with top part 482 of fuse box 491 to provide housing for the fuse sockets 496, power buses 483 and 484, and additional circuit components 494. The terminal connectors 495 connect to positive poles of electrical load and terminal connectors 493 to the negative side of electrical loads. A top view of a fuse sockets 487 is shown and illustrates the two on axis sockets 488 and 490 and a third off axis socket 489. The example sockets 487 accommodate embedded 3'BTSD and are narrower due to the form factor of the 3'BTSD having short distance between blades sockets 488 and 490 and a third blade socket 489 off axis. Blade sockets 488 and 490 connect the blades of the embedded fuse and socket 489 provides connection of the embedded TSS blade to the negative power bus 483. The additional space 494 of fuse box 491 is used to incorporate additional transient suppression components, status monitoring, display, and communication. Similarly, when necessary, a fuse box with larger additional space is provided using an extended and deeper bottom base 485 of fuse box 491.

Figure 23:
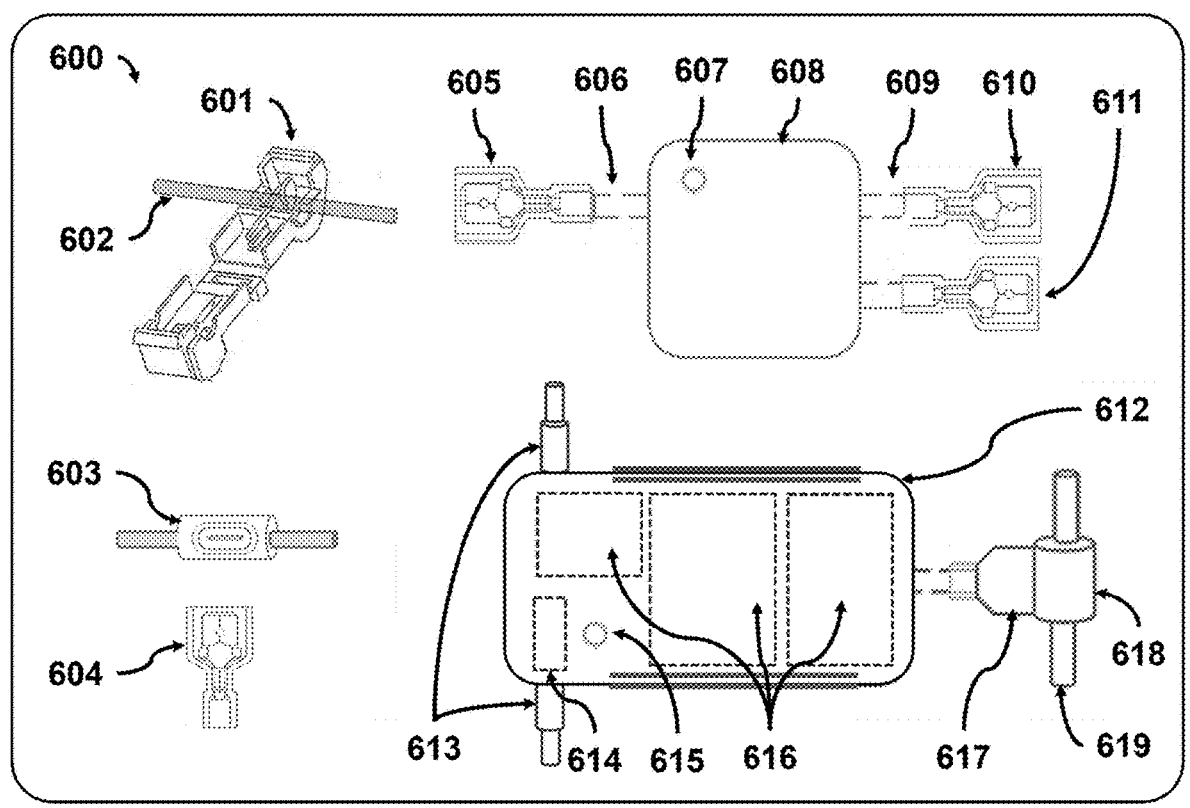
FIG. 23 presents example embodiments of embedded TSD with a T-tap quick wire-splice connectors and wire leads for other wire-splicing techniques (inline screw terminals, soldering splicing, etc.) according to an example of the instant disclosure.

Looking to FIG. 23, collection of drawings 600 presents on the left side a 3D drawing of a T-tap quick wire-splice connector 601 with a segment of a wire 602 before the closing of the T-tap 601 to form a wire snap on installation 603 as shown. The completed T-tap connection 603 has a female socket matching with a male spade connector 604. It is important to note that T-taps and other quick-splice connectors are commercially available for different gauge wires and different current/voltage ratings, respectively. Usually, they are color coded red for 22-16AWG, blue for 16-14AWG, and yellow for 12-10AWG. The common use current ratings are from 10A to 25A.

In FIG. 23, on the right side, two example embodiments 608 and 612 of embedded SPDs for inline installation are shown with their top views. SPD 608 has three male spade connectors 605, 610, and 611. Connectors 605 and 610 mounted on the short lead wires 606 and 609 are used to insert the TSD 608 inline of the positive power distribution line and connected an embedded fuse in series of the power line. The third connector 611 is used to connect to a T-tap splice on the negative power line (or the chassis of a vehicle). An embedded TSS is internally connected between spade connectors 610 and spade connector 611. This way a SPD is connected directly inline between the positive and the negative power lines. The LED indicator 607 displays a normal or malfunction status of SPD 608.

An example of a different embodiment of embedded SPD for inline installation is shown with its top view 612. The SPD 612 has two wire leads 613 for splicing connections and insertion in the positive power distribution line, resulting in an in-series inline installation directly on the positive power line. The preassembled T-tap male spade connector 617 is used to connect to the negative power distribution line 619 using an installed T-tap quick connect 618. The SPD 612 is yet another example embodiment of an embedded inline surge protection device having an appropriately rated fuse 614, plurality of TSSs components 616, and a status indicator 615.

Many new quick-connect techniques are becoming available. For example, the "Posi-Tap" is an alternative quick connect option. The important point is the installation of a TSD directly inline near the load providing a response without a propagation delay and preventing induction of transient current between the TSD and the load. The SPDs example embodiments shown in FIG. 23 are implemented using a suitable enclosure, connecting leads, and printed circuit boards with surface mounted and true-hole components with appropriate sealing for thermal management and environmental protection.

Figure 24:
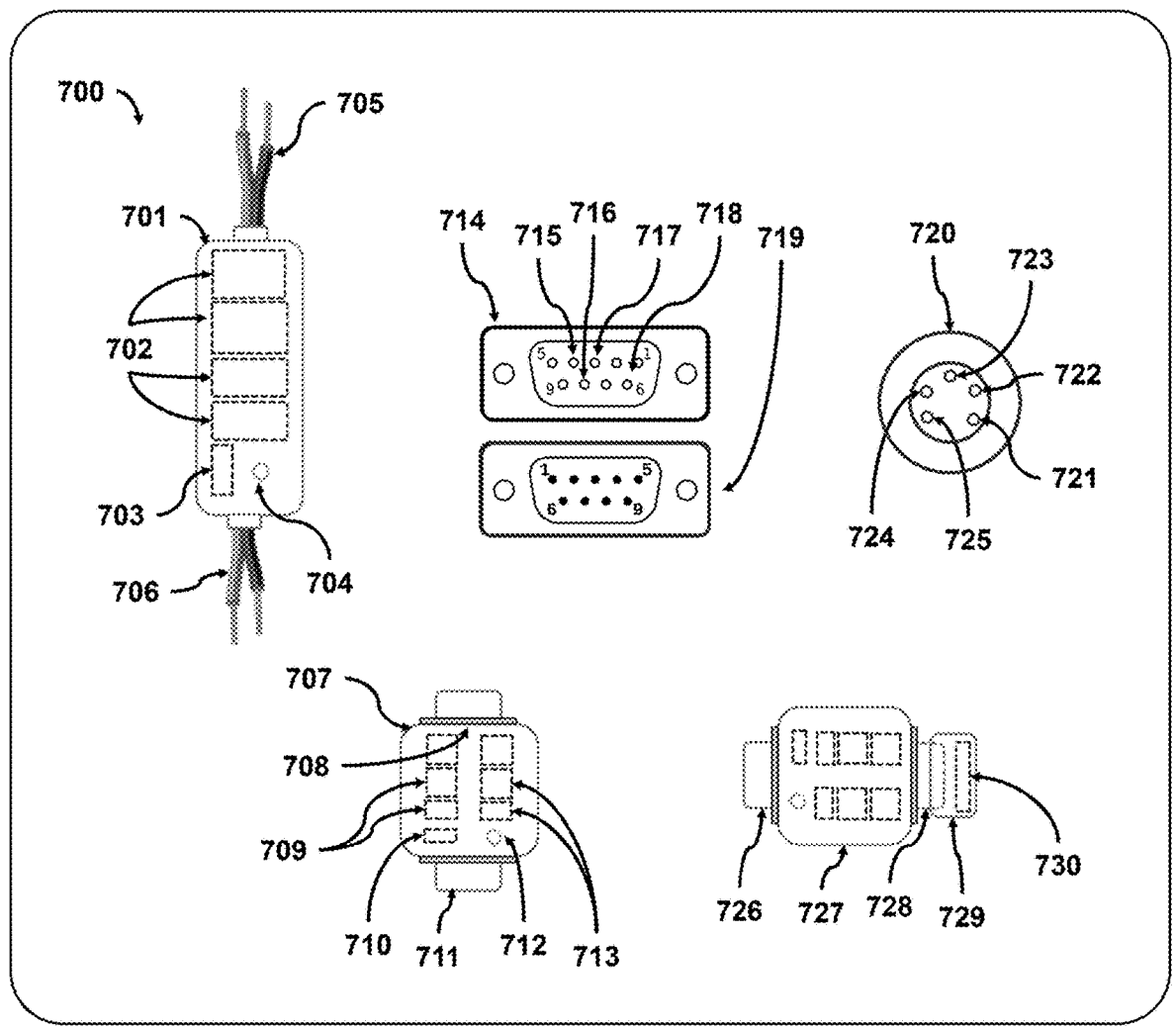
FIG. 24 displays on the left an example embodiment of an embedded TSD designed with narrow cross section enclosure for inline installation in constraint spaces. In the bottom left of FIG. 24, an embodiment of embedded TSD is displayed with integrated connectors. Two of the most used connectors, DB9 and Micro-C, are shown for inline installation. An installation of a TSD at an end point of a network is illustrated using an end terminating connector according to an example of the instant disclosure.

Looking to FIG. 24, collection of drawings 700 presents on the left side a top view of an example embodiment of an embedded TSD 701 with plurality of TSS components 702, an embedded fuse 703, and a status indicator 704. This example embodiment for inline installation has short lead wires 705 and 706, ready for inline installation using splicing techniques or connections with line screw terminals. Only two lead wires are shown. Without loss of generality, multiple leads may be embedded and used as necessary for a specific application (multiple parallel power line, CAN-BUS—controller area network, serial communication RS485, etc.). The TSS components 702 are illustrated as blocks representing groups of identical or different components configured as a primary, secondary, and tertiary surge suppression as discussed previously in this application. There are two main advantages of the embedded inline installation SPD 701. First, as illustrated, its small cross-section profile provides a convenient installation in restrained spaces. Second, this embodiment is suitable for inline installation on communication lines with extremely low insertion loss and printed circuit board (PCB) that preserves the communication bandwidth based on characteristic impedance matching. This is illustrated further with a top view of an embodiment example 707 in FIG. 24.

The top view of TSD 707 is an example embodiment that illustrates the application of a direct insertion in series into a communication bus line. The TSD 707 has a pair of male and female connectors 708 and 711 that match the connectors used in an existing communication bus line. The installation is performed by disconnecting an existing connection and reconnecting after the insertion of an SPD. The TSD 707 has a metal casing connected to bus shielding for additional EMI protection. On a bus power line wire, the embodiment provides excess current protection with an embedded fuse 710 and surge protection with a group of surge protection components 709. On communication line pairs, surge protection is provided with low capacitance surge protection components 713 which are directly installed on a matching impedance PCB transmission line providing low insertion loss and reflections to preserve the bandwidth of the communication line. For example, impedance of 120Ω on a CANBUS. To demonstrate the versatility of utilization, in FIG. 24 an example application of the TSD 727 is illustrated for use at an end point of a CANBUS or any other communication bus. For this application, a TSD 727 is connected to an end point of communication bus (for example, a CANBUS) using its connector 726, and a bus end termination cap 729 is connected to the other connector 728 of the TSD 727. The end termination cap has proper value impedance terminating components 730.

For completeness front views of connectors 714, 719, and 720 are presented in FIG. 24. These connectors are used on CANBUS, DeviceNet, and other industrial networks. The DB9 female connector 714 is shown with annotated pins for a CAN-LOW 715 and CAN-HIGH 716. These two pins are connected to the communication transmission line on a PCB with multiple surface mounted TSS components. Pins 717 and 718 are for a power lines connections. If power is supplied, it must be in a specified range (for example, +7V to +13 V, and up to 100 mA current for CANBUS). A female connector 714 is matched with a DB9 male connector 719. This provides ability for direct inline insertion on a CANBUS. Pins 3 and 6 are connected internally. Other configurations exist based on specific applications.

To illustrate the versatility of the embedded inline TSD system, the front view of a 5-pin Micro-C connector 720 is shown in FIG. 24. Pin 721 is used for connection to a cable's shield. Pins 722 and 723 are V+ and V− connections, respectively. Pins 724 and 725 are CAN-HIGH and CAN-LOW lines, respectively. Micro-C connectors are typically used in communication channels with DeviceNET protocol, which is one of the currently four higher layer protocols supported by CAN in Automation (CiA). Using Micro-C connectors on the example embedded TSD, a surge protection is installed directly inline on networks using DeviceNET protocol.

As illustrated, the methods described in this application provide inline installation for applications with cables that have power distribution lines and communication channels. In such applications the positive power line has the fuse of the embedded TSD in series and the TSS connected from the fuse to the negative power line. The communication channels are protected with low capacitance surge protection components between the lines of the channel and, when necessary, positive resistance components in series. As previously noted, matching the impedance of the communication transmission line is very important to insure a low insertion loss and to preserve the bandwidth of the channel.

It should be apparent to those skilled in the art that many more embodiments and modifications besides those already described are possible without departing from the inventive concepts herein. The inventive subject matter, therefore, is not to be restricted except in the spirit of the appended claims. Moreover, in interpreting both the specifications and the claims, all terms should be interpreted in the broadest possible manner consistent with the context. In particular, the terms "comprise" and "comprising" should be interpreted as referring to elements, components, or steps in a non-exclusive manner, indicating that the referenced elements, components, or steps may be present, or utilized, or combined with other elements, components, or steps that are not expressly referenced and may be used in an embodiment. It is understood that while certain forms of this invention have been illustrated and described, they are not limited thereto except insofar as such limitations are included in the following claims and allowable functional equivalents thereof.

What is claimed is:

1. A method for suppressing an electrical surge induced by a transient electromagnetic energy disturbance, comprising one of an electromagnetic pulse (EMP) generated by a high-altitude nuclear weapon detonation (HEMP), Intentional Electromagnetic Interference (IEMI) generated by directed energy electromagnetic warfare weapons, naturally occurring events comprising lightning strikes, Coronal mass ejection (CME), and Geomagnetic disturbance (GMD), from reaching electrical and electronic devices connected to an alternating current (AC) or direct current (DC) electrical power network (EPN), the method comprising:

responding to an overvoltage exceeding a predetermined threshold level T1 induced by an electromagnetic pulse in the electrical power network (EPN) providing power to connected electrical and electronic devices associated with the EPN by an embedded surge protection assembly (ESPD) for inline installation;

the ESPD for inline installation responding instantaneously to the overvoltage comprises limiting, absorbing, switching, and shunting the overvoltage after the overvoltage exceeds the predetermined threshold level T1 to limit a level of the overvoltage to a magnitude of the predetermined threshold level T1 using a primary transient surge suppressing assembly comprising at least one of transient voltage suppressors (TVSs), metal oxide varistors (MOVs), gas discharge tubes (GDTs), glass GDTs, avalanche transistors (ATs), spark gap protectors (SPG) and thyristor surge suppressors (TSS), other solid state (SS) and nonlinear components and circuits (NLCCs) based on semiconductors, compound semiconductors and metamaterials, and electro-mechanical, electrical, and ionization discharge devices (IDDs);

responding to an overvoltage exceeding a predetermined threshold level T2, lower than the predetermined threshold level T1, induced by a sequential or enduring in time component of the electromagnetic pulse in the EPN, connected to the electrical and electronic devices associated with the EPN;

the ESPD for inline installation responding to lower level overvoltage at threshold T2, including overcurrent protection and decoupling, limiting, absorbing, switching, and shunting the lower overvoltage to limit a level of the lower overvoltage to magnitude of the predetermined threshold level T2, using a secondary transient surge suppressing assembly comprising at least one of TVSs, polymeric positive temperature coefficient thermistors (PPTCs), negative temperature coefficient thermistors (NTCs), MOVs, GDTs, GGDTs, Ats, other SS and NLCCs based on semiconductors, compound semiconductors and metamaterials, and electro-mechanical, electrical, and IDDs;

responding to a continuing overvoltage exceeding a predetermined threshold level T3 and a predetermined time duration D, the overvoltage being induced by a sequential or enduring in time component of the electromagnetic pulse in the EPN connected to the electrical and electronic devices associated with the EPN; and the ESPD for inline installation responding to overvoltage at threshold T3, including limiting, absorbing, switching, and shunting the overvoltage to limit the overvoltage magnitude to the predetermined threshold level T3, lower or equal to the predetermined threshold level T2, and disconnecting electrical loads after time duration exceeding the predetermined time duration D, using a tertiary transient surge suppressing assembly comprising at least one of TVSs, MOVs, GDTs, GGDTs, ATs, other NLCCs, thyristor surge suppressors (TSS), solid state relay (SSR) and SS switches based on semiconductors, compound semiconductors and metamaterials, and electro-mechanical, electrical, and IDDs, wherein electrically connected primary, secondary, and tertiary transient surge suppressing assemblies (TSSAs) are in series with a current limiting fuse to form an embedded hybrid transient suppression device (EHTSD) to provide transient voltage surge and overcurrent protection to the EPN, associated power source, electrical and electronic loads with an inline insertion connection such that the EHTSD is properly scaled to the EPN source, transmission line, and load characteristic specifications and the EHTSD for inline insertion connection with the primary, secondary, and tertiary transient surge suppressing assemblies in series with the current limiting fuse, have mutually scaled current capacity, respectively, and limit mutual operational degradation when limiting, absorbing, switching, and shunting, respectively.

2. The method for suppressing an electrical surge as in claim 1, wherein the inline insertion connection of the EHTSD with the primary, secondary, and tertiary transient surge suppressing assemblies in series with the current limiting fuse, respectively, comprising three staged protective assemblies, the staged protective assemblies comprising:

the primary transient surge suppressing assembly having an instantaneous response to high-level, short-duration overvoltage exceeding the predetermined threshold level T1;

the secondary transient surge suppressing assembly having an instantaneous response to intermediate-level, intermediate-duration overvoltage exceeding the predetermined threshold level T2; and the tertiary transient surge suppressing assembly having a response to lower-level, long-duration overvoltage exceeding the predetermined threshold level T3 for the time duration D.

3. The method for suppressing an electrical surge as in claim 1, wherein the inline insertion connection of the EHTSD with the primary, secondary, and tertiary transient surge suppressing assemblies in series with the current limiting fuse, respectively, form protective assemblies that limit interference with normal operation of electrical load associated with the EPN and disconnect the electrical load when the overvoltage exceeds a predetermined time duration.

4. The method for suppressing an electrical surge as in claim 1, further comprising means for mounting the EHTSD in a casing with form factor and interoperable hardware connections with matched voltage and current ratings and interface connections based on electrical code and standards.

5. The method for suppressing an electrical surge as in claim 1, wherein the EHTSD with the primary, secondary, and tertiary transient surge suppressing assemblies (TSSAs) in series with the current limiting fuse, mounted in the casing, comprise TSSAs mounted on a printed circuit board (PCB) with electrical interface connectors configured to connect to power distribution conductors utilizing lead wires, terminal connectors, T-tap spade connectors, splice connections, and other connectors specified by existing consumer and industrial electrical standards, electrical connectors, and proprietary custom connectors for inline insertion installation.

6. The method for suppressing an electrical surge as in claim 5, wherein the EHTSD with the casing and the electrical interface connectors is operable for direct inline insertion installation on the electrical power network (EPN) at an AC or DC power source, at an electrical load, and inline distributed installation at midspan points on an EPN branch.

7. The method for suppressing an electrical surge as in claim 1, wherein each of the EHTSD with the primary, secondary, and tertiary TSSAs in series with the current limiting fuse, includes a plurality of limiting, absorbing, switching, and shunting type devices selected from groups including TVSs, MOVs, GDTs, IDDs, polymeric positive temperature coefficient thermistors (PPTCs), negative temperature coefficient thermistors (NTCs), thyristor surge suppressors (TSS), solid state relay (SSR), other solid state and nonlinear component circuits based on semiconductors, compound semiconductors, electro-mechanical, and electronic and electrical components, and combinations thereof, scalable for voltage, current, and energy handling capacity.

8. The method for embedded inline suppressing an electrical surge as in claim 1, wherein the primary, secondary, and tertiary TSSAs have varied response times and the predetermined threshold levels have values T1>T2≥T3, respectively, and are operable to react to and suppress primarily one of the E1, E2, and E3 component pulses of the HEMP, respectively, without time delay response associated with length of connecting lead wires.

9. The method for suppressing an electrical surge as in claim 1, wherein the primary, secondary, and tertiary TSSAs include components to protect against high voltage transients induced by intentional electromagnetic interference and naturally occurring events, wherein the tertiary TSSA provides protection to electrical load with a soft power disconnect after a predetermined surge time duration associated with HEMP E3 and GMD.

10. The method of claim 1, wherein the semiconductor comprises at least one of Si and Ge.

11. The method of claim 1, wherein the compound semiconductor comprises at least one of SiC, GaN, and GaA.

12. A system for suppressing an electrical surge in a dedicated power distribution line, comprising:

embedded primary, secondary, and tertiary transient surge suppressing assemblies (TSSAs) or a subset of TSSAs in series with a current limiting fuse, embedded and sealed in a casing with at least two electrically conductive blades comprising an embedded hybrid transient surge device (EHTSD) for direct insertion in a fuse box with two-blade sockets; and a conductor wire to connect the TSSAs, embedded in series with the fuse, to the negative power distribution wire of an EPN, wherein the EHTSD, mounted in the casing with electrical interface connectors as three-blades on a single axis for use with a custom fuse box, match a pattern of the three-blade casing, and the fuse box with three-blades sockets having internal power buses for electrical connections to positive and negative power source lines, additional TSSAs, status monitoring and display circuit, and screw terminals for connecting an electrical load.

13. The system for suppressing an electrical surge as in claim 12, wherein the EHTSD and the electrical interface connectors are implemented as a three-blades casing for inline installation with an inline holder with three-blades sockets matching the three-blades casing pattern, connecting the embedded fuse in series on a positive power line between power source and an electrical load and connecting the TSSA embedded after the fuse between the positive and a counterpart negative power line.

14. The system for suppressing an electrical surge as in claim 12, wherein the EHTSD with at least one TSSA in series with the current limiting fuse for power line surge protection, is implemented with three-blades casing for use with a fuse box, wherein the fuse box with three-blade sockets includes circuits for monitoring power line voltage and current conditions status, and self-monitoring with status indicators using embedded visual, audible, and remote communication signals.

15. The system for suppressing an electrical surge as in claim 12, wherein the fuse box used with EHTSDs comprises individual status display light indicators and additional TSSAs for increased surge protection capacity.

16. The system for suppressing an electrical surge as in claim 15, wherein the fuse box for use with EHTSDs comprises an additional space and status monitoring, display, and inline communication.

17. A system for suppressing an electrical surge induced by a transient electromagnetic energy disturbance comprising:
embedded surge protection assembly (ESPD) for inline installation responding to an overvoltage exceeding a predetermined threshold level T1 induced by an electromagnetic pulse in an electrical power network (EPN) providing power to connected electrical and electronic devices associated with the EPN, the ESPD for inline installation responding instantaneously to the overvoltage comprising limiting, absorbing, switching, and shunting the overvoltage after the overvoltage exceeds the predetermined threshold level T1 to limit a level of the overvoltage to a magnitude of the predetermined threshold level T1 using a primary transient surge suppressing assembly comprising at least one of transient voltage suppressors (TVSs), metal oxide varistors (MOVs), gas discharge tubes (GDTs), glass GDTs, avalanche transistors (ATs), spark gap protectors (SPG) and thyristor surge suppressors (TSS), other solid state (SS) and nonlinear components and circuits (NLCCs) based on semiconductors, compound semiconductors and metamaterials, and electro-mechanical, electrical, and ionization discharge devices (IDDs);

a secondary transient surge suppressing assembly comprising at least one of TVSs, polymeric positive temperature coefficient thermistors (PPTCs), negative temperature coefficient thermistors (NTCs), MOVs, GDTs, GGDTs, Ats, other SS and NLCCs based on semiconductors, compound semiconductors and metamaterials, and electro-mechanical, electrical, and IDDs responding to lower level overvoltage at a predetermined threshold level threshold T2, including overcurrent protection and decoupling, limiting, absorbing, switching, and shunting the lower overvoltage to limit a level of the lower overvoltage to magnitude of the predetermined threshold level T2, the predetermined threshold level T2 lower than the predetermined threshold level T1, induced by a sequential or enduring in time component of the electromagnetic pulse in the EPN, connected to the electrical and electronic devices associated with the EPN; and a tertiary transient surge suppressing assembly comprising at least one of TVSs, MOVs, GDTs, GGDTs, ATs, other NLCCs, thyristor surge suppressors (TSS), solid state relay (SSR) and SS switches based on semiconductors, compound semiconductors and metamaterials, and electro-mechanical, electrical, and IDDs responding to overvoltage at a predetermined threshold level threshold T3, including limiting, absorbing, switching, and shunting the overvoltage to limit the overvoltage magnitude to the predetermined threshold level T3, lower or equal to the predetermined threshold level T2, and disconnecting electrical loads after time duration exceeding a predetermined time duration D, the overvoltage exceeding the predetermined threshold level T3 being induced by a sequential in time component of the electromagnetic pulse in the EPN connected to the electrical and electronic devices associated with the EPN, wherein electrically connected primary, secondary, and tertiary transient surge suppressing assemblies (TSSAs) are in series with a current limiting fuse to form an embedded hybrid transient suppression device (EHTSD) to provide transient voltage surge and overcurrent protection to the EPN, associated power source, electrical and electronic loads with an inline insertion connection such that the EHTSD is properly scaled to the EPN source, transmission line, and load characteristic specifications and the EHTSD for inline insertion connection with the primary, secondary, and tertiary transient surge suppressing assemblies in series with the current limiting fuse, have mutually scaled current capacity, respectively, and limit mutual operational degradation when limiting, absorbing, switching, and shunting, respectively.

* * * * *